(12) United States Patent
Muehl et al.

(10) Patent No.: US 11,334,219 B2
(45) Date of Patent: May 17, 2022

(54) PRESENTING MESSAGES VIA GRAPHICAL OBJECTS IN A GRAPHICAL USER INTERFACE

(71) Applicant: Yahoo Holdings, Inc., Sunnyvale, CA (US)

(72) Inventors: Sebastian Muehl, Menlo Park, CA (US); Anthony Richard Murphy, San Jose, CA (US); Frank Richard Bentley, San Francisco, CA (US); Bryan Sze Pui Wong, Union City, CA (US); Danny Javier Espinoza, Palo Alto, CA (US); Vince Borja Magistrado, Redlands, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 374 days.

(21) Appl. No.: 15/810,614

(22) Filed: Nov. 13, 2017

(65) Prior Publication Data

US 2019/0146635 A1 May 16, 2019

(51) Int. Cl.
| | |
|---|---|
| G06F 3/00 | (2006.01) |
| G06F 9/00 | (2006.01) |
| G06F 17/00 | (2019.01) |
| G06F 3/0482 | (2013.01) |
| H04L 51/42 | (2022.01) |
| G06F 3/04883 | (2022.01) |
| G06F 3/0485 | (2022.01) |
| G06F 3/04817 | (2022.01) |
| G06F 3/0483 | (2013.01) |

(52) U.S. Cl.
CPC .......... G06F 3/0482 (2013.01); G06F 3/0483 (2013.01); G06F 3/0485 (2013.01); G06F 3/04817 (2013.01); G06F 3/04883 (2013.01); H04L 51/22 (2013.01)

(58) Field of Classification Search
CPC .. G06F 3/0482; G06F 3/0483; G06F 3/04883; G06F 3/0485; G06F 3/04817; H04L 51/22
See application file for complete search history.

(56) References Cited

U.S. PATENT DOCUMENTS

| | | | |
|---|---|---|---|
| 9,483,529 B1* | 11/2016 | Pasoi | H04L 51/32 |
| 2008/0122796 A1* | 5/2008 | Jobs | G06F 3/04883 |
| | | | 345/173 |
| 2011/0119610 A1* | 5/2011 | Hackborn | G06F 3/0481 |
| | | | 715/768 |

(Continued)

*Primary Examiner* — Tadesse Hailu
*Assistant Examiner* — Anita D Chaudhuri
(74) *Attorney, Agent, or Firm* — Cooper Legal Group LLC

(57) ABSTRACT

One or more computing devices, systems, and/or methods for graphically presenting messages are provided. For example, a plurality of messages, associated with a messaging account, comprising a first message and a second message may be received. A first graphical object may be generated by a device, such as a server and/or a client device of a user, based upon the first message. A second graphical object may be generated by the device based upon the second message. In response to receiving a request to access the messaging account, the device may present the first graphical object. In response to receiving one or more user inputs corresponding to the first graphical object, an action may be performed and/or the second graphical object may be presented.

20 Claims, 12 Drawing Sheets

(56) References Cited

U.S. PATENT DOCUMENTS

| | | | | |
|---|---|---|---|---|
| 2014/0006977 A1* | 1/2014 | Adams | H04L 51/32 | 715/758 |
| 2014/0201613 A1* | 7/2014 | Della Corte | G06F 16/338 | 715/233 |
| 2014/0317543 A1* | 10/2014 | Kim | G06F 3/04817 | 715/765 |
| 2017/0142036 A1* | 5/2017 | Li | H04L 51/16 | |
| 2017/0149720 A1* | 5/2017 | Castagna | H04L 12/1859 | |

* cited by examiner

PRESENTING MESSAGES VIA GRAPHICAL OBJECTS IN A GRAPHICAL USER INTERFACE

BACKGROUND

Many services, such as instant messaging services, email services, social networks and apps may allow a user to create an account capable of sending and receiving messages, such as an email account. The user may want to view, determine a significance of and/or act upon received messages.

SUMMARY

In accordance with the present disclosure, one or more computing devices and/or methods for graphically presenting, via a graphical user interface, messages of a messaging account are provided. In an example, a plurality of messages comprising a first message and a second message, associated with the messaging account, may be received. A first graphical object may be generated based upon the first message. A second graphical object may be generated based upon the second message. The first graphical object and the second graphical object may be stored in a messaging interface data structure. The first graphical object may be retrieved from the messaging interface data structure. The second graphical object may be retrieved from the messaging interface data structure. Responsive to receiving a request to access the messaging account, the first graphical object may be presented. Responsive to receiving one or more user inputs corresponding to the first graphical object, an action, associated with a first user input of the one or more user inputs, may be performed and/or the second graphical object may be presented.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
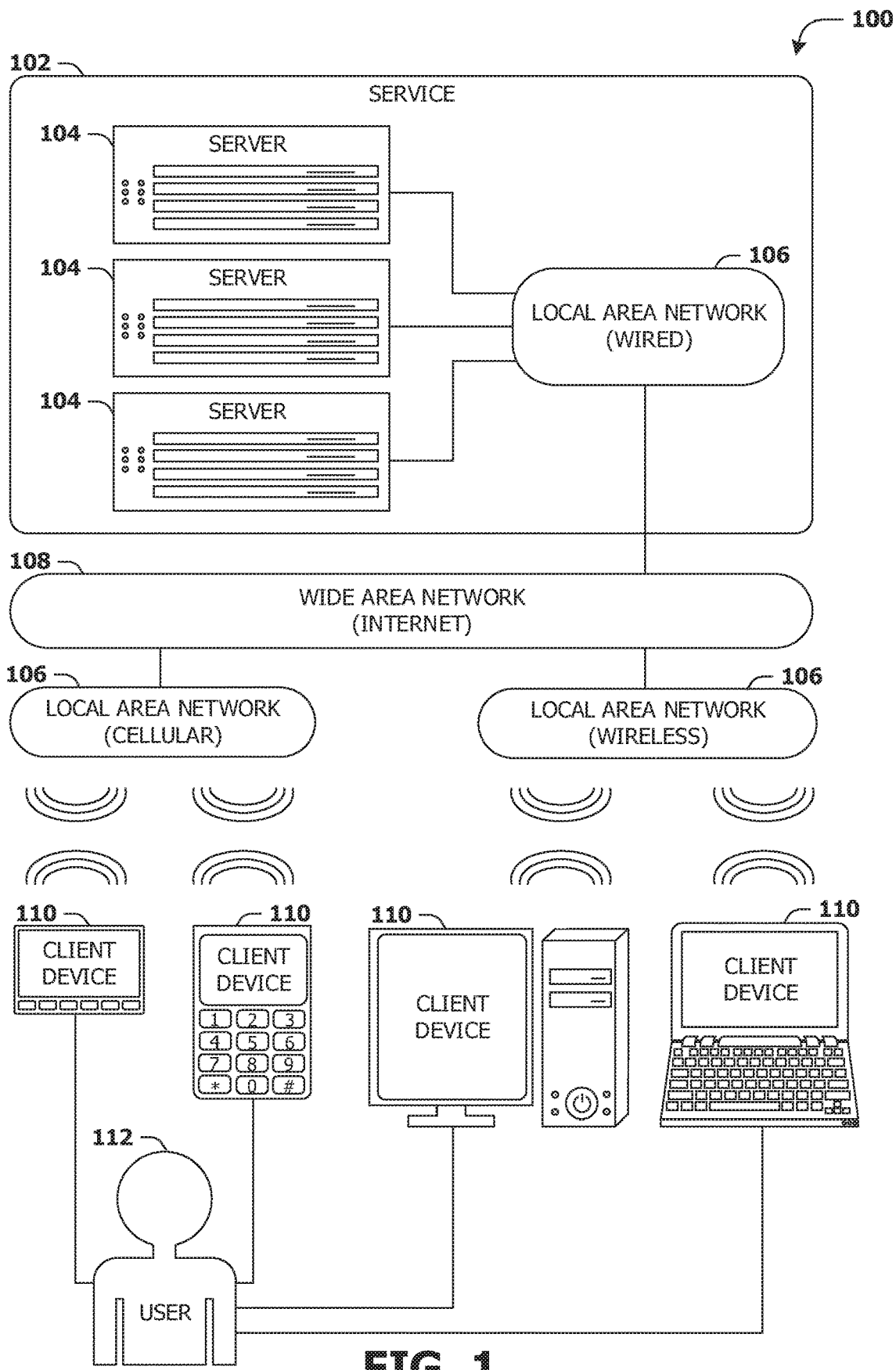
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
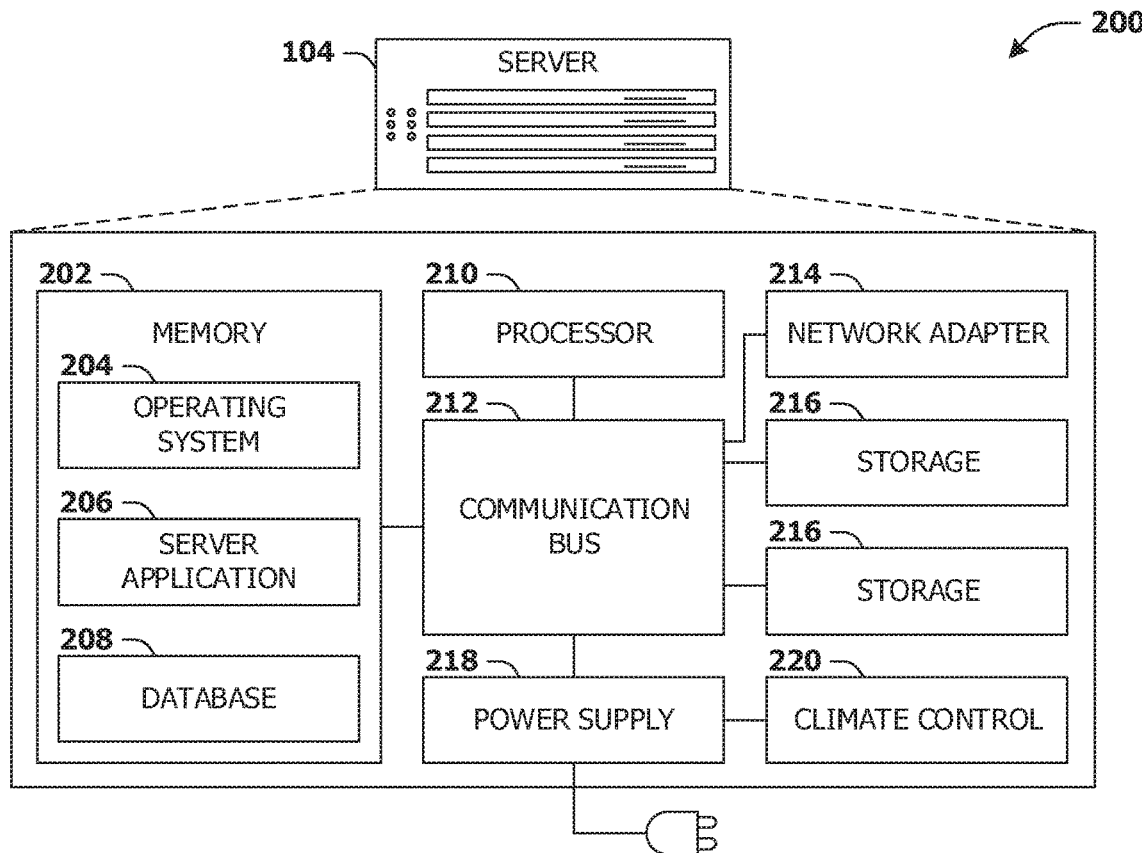
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectable to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
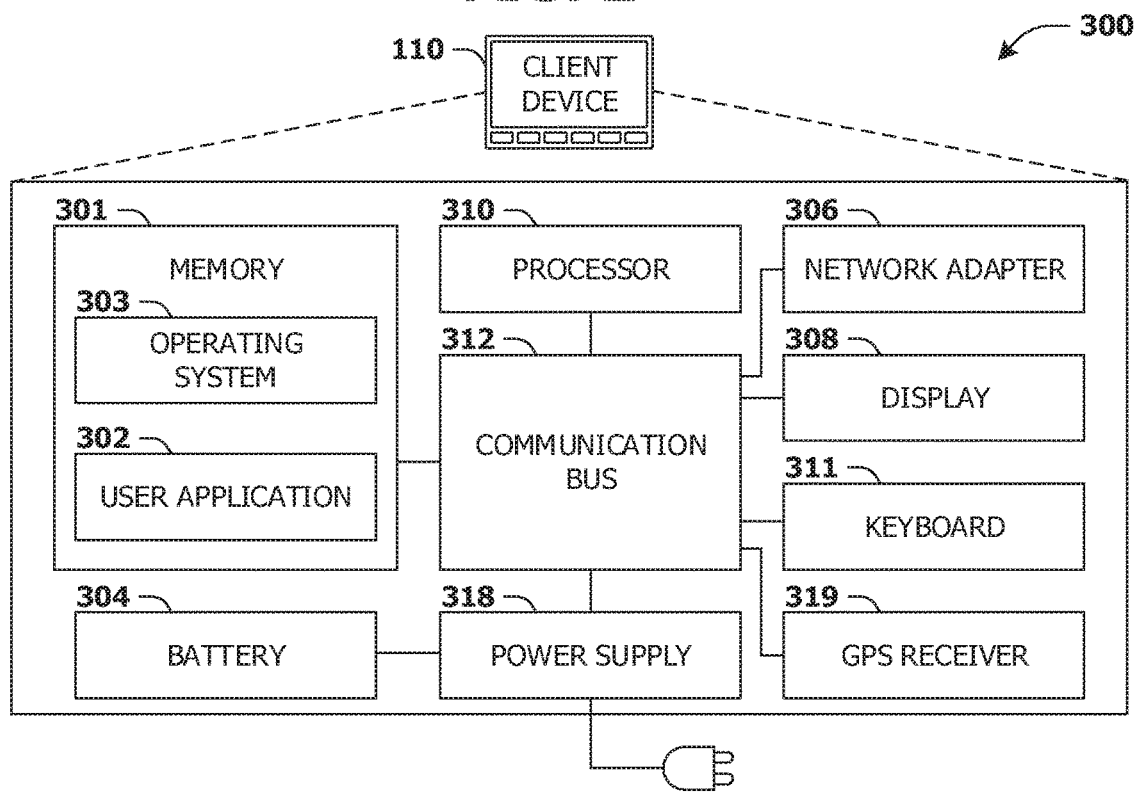
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectable to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for presenting messages via a graphical user interface are provided. For example, a user may have a messaging account (e.g., such as an email account, an instant messaging account, a social network account, etc.). A plurality of messages (e.g., such as messages unread by the user and/or messages that the user is interested in), associated with the messaging account, may be received (e.g., by a server and/or a client device of the user). The user may want to view the plurality of messages via one or more interfaces on the client device (e.g., such as an email client, a browser, an app, or another interface on the client device). Viewing (e.g., and/or reading) (e.g., each of) the plurality of messages, determining a significance of (e.g., each of) the plurality of messages and/or acting upon (e.g., each of) the plurality of messages may requiring selecting each message from a list/folder of messages, interacting with each message, returning to the list/folder of messages, and then proceeding to a next message, and thus may consume a significant amount of time and/or resources of the user (e.g., mental energy, attention, etc.). Thus, in accordance with one or more of the techniques presented herein, the plurality of messages may be presented, via a plurality of graphical objects, to allow the user to view (e.g., and/or read) (e.g., each of) the plurality of messages, determine the significance of (e.g., each of) the plurality of messages and/or act upon (e.g., each of) the plurality of messages by viewing, reading and/or acting upon (e.g., each of) the plurality of graphical objects corresponding to the plurality of messages. The plurality of messages may be presented such that, responsive to receiving one or more user inputs corresponding to a first graphical object (e.g., generated based upon a first message of the plurality of messages) while presenting the first graphical object, an action associated with a first user input of the one or more user inputs may be performed and/or a second graphical object (e.g., generated based upon a second message of the plurality of messages) may be presented. Thus, in accordance with one or more of the techniques presented herein, one or more actions may be performed, one or more graphical objects may be presented and the user may navigate through the one or more graphical objects without a need to present a list of the plurality of messages. Viewing (e.g., and/or reading), determining the significance of, acting upon and/or navigating through (e.g., each of) the plurality of messages, via the plurality of graphical objects, may require less time and/or resources (e.g., less mental energy, less attention, etc.) than viewing (e.g., and/or reading), acting upon and/or navigating through the plurality of messages using a conventional system.

Figure 4A:
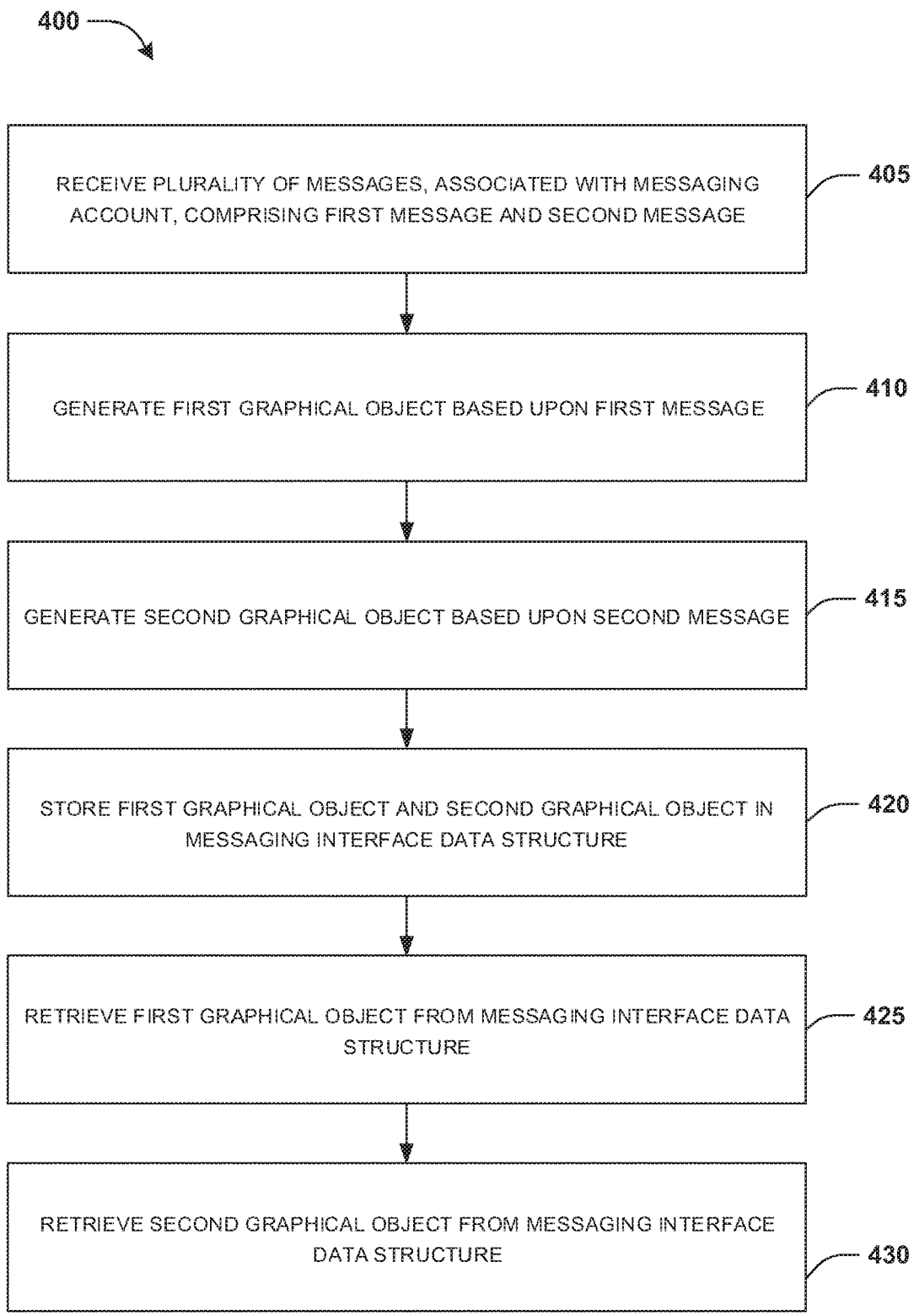
FIGS. 4A-4B are flow charts illustrating an example method for presenting messages of a messaging account.
Figure 4B:
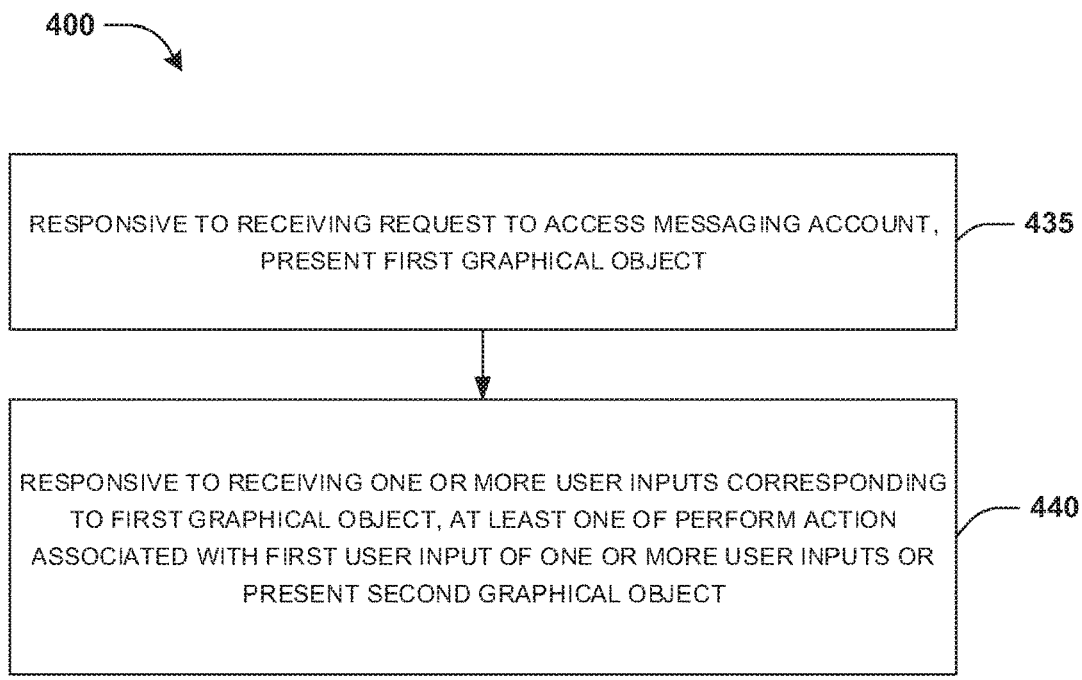

An embodiment of graphically presenting messages of a messaging account is illustrated by an example method 400 of FIGS. 4A-4B. In some examples, the messaging account may comprise an email account. A user, such as user Jill, (e.g., and/or a client device) may access and/or interact with a service for sending and receiving messages, such as an email service, an instant messaging service, a social network, an app, etc. The messaging account of the user with the service may be accessed and/or interacted with via one or more interfaces on the client device, such as an email client, a browser, an app, or another interface on the client device. Accordingly, at 405, a plurality of messages comprising a first message and a second message, associated with the messaging account, may be received (e.g., by a server and/or the client device) (e.g., via an email client, via a browser, via an app, via a social network, via an instant messaging service, etc.).

In some examples, a plurality of graphical objects corresponding to the plurality of messages may be generated (e.g., by the server and/or the client device) based upon the plurality of messages. Accordingly, at 410, a first graphical object may be generated (e.g., by the server and/or the client device) based upon the first message. At 415, a second graphical object may be generated (e.g., by the server and/or the client device) based upon the second message. In some examples, the plurality of graphical objects may (e.g., each) comprise a timestamp (e.g., indicating a time and a date that a message was sent and/or received), a star icon (e.g., indicating an importance of the message), a sender name (e.g., a username and/or a user identification of a sender of the message), a sender icon (e.g., a visual representation of the sender), one or more recipients (e.g., one or more usernames and/or one or more identifications of the one or more recipients), a subject, one or more attachments (e.g., files attached to the message by the sender), content and/or a (e.g., abstractive and/or extractive) summary of the message.

In an example, a timestamp of the first graphical object may correspond to a first time when the first message was sent and/or received (e.g., by the server and/or the client device). For example, the timestamp may comprise "2h" (e.g., representing that the first message was sent and/or received around two hours before the first graphical object was presented). A star icon of the first graphical object may indicate an importance of the first message. For example, the user may select that the first message be marked as important (e.g., starred) by selecting the star icon. A sender name of the first graphical object may indicate a username and/or a user identification of a sender of the first message. For example, the sender name may comprise "gregrocks@ gregrockscompany.com" based upon a username (e.g., an email address) of the sender of the first message. In another example, the sender name may comprise "Gregory Jones" based upon a user identification (e.g., a name) of the sender of the first message. In some examples, a subject of the first graphical object may indicate a subject of the first message (e.g., extracted from a header of the first message). For example, the subject may comprise "Saturday Brunch". In some examples, the first graphical object may comprise (e.g., unedited) content of the first message. For example, the content may comprise: "Hey everyone, we need to catch up. Should we schedule a brunch date for this Saturday at the new pancake place that's down the street from my house?" Alternatively and/or additionally, the first graphical object may comprise a (e.g., abstractive and/or extractive) summary of the first message. For example, natural language processing (NLP) may be applied to the first message (e.g., by the server and/or the client device) to generate an abstractive summary. For example, the (e.g., abstractive) summary may comprise: "Gregory is scheduling brunch at new pancake place for Saturday." In another example, one or more (e.g., verbatim) extracts may be extracted from the first message (e.g., by the server and/or the client device) to generate an extractive summary. For example, the (e.g., extractive) summary may comprise: " . . . should we schedule a brunch date for this Saturday . . . at the new pancake place . . . ?"

In some examples, the plurality of graphical objects may be stored (e.g., by the server and/or the client device) in a messaging interface data structure. Accordingly, at 420, the first graphical object and the second graphical object may be stored in the messaging interface data structure. In some examples, the plurality of graphical objects may be stored (e.g., and/or arranged) (e.g., by the server and/or the client device) in the messaging interface data structure based upon an order (e.g., such that the plurality of graphical objects may be presented according to the order).

In some examples, the order may be based upon a plurality of times corresponding to the plurality of messages. For example, the first message may have a first timestamp corresponding to the first time. The second message may have a second timestamp corresponding to a second time. In an example, the second time may be after the first time. The first graphical object (e.g., corresponding to the first message) and the second graphical object (e.g., corresponding to the second message) may be stored (e.g., and/or arranged) (e.g., by the server and/or the client device) in the messaging interface data structure based upon the first time and the second time. The first graphical object and the second graphical object may be stored (e.g., and/or arranged) (e.g., by the server and/or the client device) in the messaging interface data structure such that the first graphical object may be presented before the second graphical object. Alternatively and/or additionally, the first graphical object and the second graphical object may be stored (e.g., and/or arranged) (e.g., by the server and/or the client device) in the messaging interface data structure such that the first graphical object may be presented after the second graphical object.

Alternatively and/or additionally, the order may be based upon a second plurality of times corresponding to a second plurality of messages within a messaging conversation. For example, a third message may have a third timestamp corresponding to a third time. In an example, the third time may be between the first time (e.g., corresponding to the first message) and the second time (e.g., corresponding to the second message) (e.g., the third time may be after the first time and before the second time). The first message and the second message may be comprised within the messaging conversation. The third message may not be comprised within the messaging conversation. One or more graphical objects corresponding to messages within the messaging conversation (e.g., the first graphical object and the second graphical object) and a third graphical object corresponding to a third message may be stored (e.g., and/or arranged) (e.g., by the server and/or the client device) in the messaging interface data structure such that the one or more graphical objects (e.g., the first graphical object and the second graphical object) may be presented consecutively before the third graphical object.

Alternatively and/or additionally, the order may be based upon a plurality of importance rankings corresponding to the plurality of messages. The plurality of importance rankings may be determined (e.g., by the server and/or the client device) by analyzing a star icon, a sender, one or more recipients, a subject, one or more attachments and/or content of (e.g., each of) the plurality of messages. For example, the first message may have a first importance ranking (e.g., determined by the server, the client device and/or the user). The second message may have a second importance ranking (e.g., determined by the server, the client device and/or the user). In an example, the second importance ranking may be higher than the first importance ranking and the second time may be after the first time. The first graphical object (e.g., corresponding to the first message) and the second graphical object (e.g., corresponding to the second message) may be stored (e.g., and/or arranged) (e.g., by the server and/or the client device) in the messaging interface data structure based upon the first importance ranking and the second importance ranking (e.g., rather than the first time and the second time). The first graphical object and the second graphical object may be stored (e.g., and/or arranged) (e.g., by the server and/or the client device) in the messaging interface data structure such that the second graphical object may be presented before the first graphical object (e.g., in order of importance).

In some examples, the plurality of graphical objects may be retrieved (e.g., by the server and/or the client device) from the messaging interface data structure. Accordingly, at 425, the first graphical object may be retrieved (e.g., by the server and/or the client device) from the messaging interface data structure. At 430, the second graphical object may be retrieved (e.g., by the server and/or the client device) from the messaging interface data structure.

In some examples, the server and/or the client device may receive a request to access the messaging account. In some examples, the request may be received by using a conversational interface (e.g., a voice recognition and natural language interface), a touchscreen, a switch (e.g., an interface comprising one or more buttons) and/or a different type of interface. At 435, responsive to receiving the request to access the messaging account, the first graphical object may be presented (e.g., via a screen). In some examples, the first graphical object may be retrieved (e.g., by the server and/or the client device) from the messaging interface data structure responsive to receiving the request to access the messaging account. In some examples, the first graphical object may be displayed on the screen. At least a portion (e.g., a first portion, but not a second portion) of the second graphical object may be displayed adjacent to (e.g., below, next to, etc.) the first graphical object on the screen (e.g., such that the second graphical object is partially visible).

In some examples, a first portion of the first graphical object may be displayed on the screen (e.g., the first graphical object may not be completely displayed on the screen due to a size of the first graphical object and/or a size of the screen). Responsive to receiving a user input, a second portion of the first graphical object may be displayed. The user input may be received by using a conversational interface (e.g., a voice recognition and natural language interface), a touchscreen, a switch and/or a different type of interface. In some examples, the user input may comprise pressing one or more touch objects (e.g., fingers, styluses, etc.) on the touch screen. Alternatively and/or additionally, the user input may comprise pressing one or more buttons and/or switches. Alternatively and/or additionally, the user input may comprise sliding one or more touch objects on the touchscreen.

For example, the user input may comprise sliding one or more touch objects vertically (e.g., scrolling) on the touchscreen. In an example, the user input may comprise sliding one touch object vertically on the touchscreen. Alternatively and/or additionally, the user input may comprise (e.g., concurrently, sequentially, etc.) sliding two touch objects vertically on the touchscreen. Alternatively and/or additionally, the user input may comprise (e.g., concurrently, sequentially, etc.) sliding three touch objects vertically on the touchscreen. Alternatively and/or additionally, the user input may comprise (e.g., concurrently, sequentially, etc.) sliding a specific (e.g., defined) number of touch objects vertically on the touchscreen. Accordingly, the first graphical object may move (e.g., scroll) vertically from the first portion to the second portion. In some examples, the first graphical object may move (e.g., scroll) vertically continuously from the first portion to the second portion. Alternatively and/or additionally, the first graphical object may move (e.g., scroll) vertically based upon (e.g., controlled by) the user input. For example, movement of the first graphical object may be controlled by movement of the one or more touch objects on the touch screen. A speed of the movement of the first graphical object may be based upon a speed of the movement of the one or more touch objects on the touch screen. A position of the first graphical object may be based upon a position of the one or more touch objects on the touch screen.

Alternatively and/or additionally, the user input may comprise sliding one or more touch objects horizontally (e.g., scrolling) on the touchscreen. In an example, the user input may comprise sliding one touch object horizontally on the touchscreen. Alternatively and/or additionally, the user input may comprise (e.g., concurrently, sequentially, etc.) sliding two touch objects horizontally on the touchscreen. Alternatively and/or additionally, the user input may comprise (e.g., concurrently, sequentially, etc.) sliding three touch objects horizontally on the touchscreen. Alternatively and/or additionally, the user input may comprise (e.g., concurrently, sequentially, etc.) sliding a specific (e.g., defined) number of touch objects horizontally on the touchscreen. Accordingly, the first graphical object may move (e.g., scroll) horizontally from the first portion to the second portion. In some examples, the first graphical object may move (e.g., scroll) horizontally continuously from the first portion to the second portion. Alternatively and/or additionally, the first graphical object may move (e.g., scroll) horizontally based upon (e.g., controlled by) the user input. For example, movement of the first graphical object may be controlled by movement of the one or more touch objects on the touch screen. A speed of the movement of the first graphical object may be based upon a speed of the movement of the one or more touch objects on the touch screen. A position of the first graphical object may be based upon a position of the one or more touch objects on the touch screen. Alternatively and/or additionally, the user input may comprise sliding one or more touch objects diagonally (e.g., at an angle between a horizontal axis and a vertical axis) (e.g., scrolling) on the touchscreen.

At 440, responsive to receiving one or more user inputs corresponding to the first graphical object, an action associated with a first user input of the one or more user inputs may be performed and/or the second graphical object (e.g., the first portion and/or the second portion) may be presented (e.g., via a screen) (e.g., such that the second graphical object is completely visible). In some examples, the second graphical object may be retrieved (e.g., by the server and/or the client device) from the messaging interface data structure responsive to receiving the one or more user inputs. The first user input may be received by using a conversational interface (e.g., a voice recognition and natural language interface), a touchscreen, a switch (e.g., an interface comprising one or more buttons) and/or a different type of interface. In some examples, the first user input may comprise pressing one or more touch objects on the touch screen. Alternatively and/or additionally, the first user input may comprise pressing one or more buttons and/or switches. Alternatively and/or additionally, the first user input may comprise sliding one or more touch objects on the touchscreen.

For example, the first user input may comprise sliding one or more touch objects horizontally, vertically and/or diagonally (e.g., scrolling) on the touchscreen. In an example, the first user input may comprise sliding one touch object horizontally, vertically and/or diagonally on the touchscreen. Alternatively and/or additionally, the first user input may comprise sliding two touch objects horizontally, vertically and/or diagonally on the touchscreen. Alternatively and/or additionally, the first user input may comprise sliding three touch objects horizontally, vertically and/or diagonally on the touchscreen. Alternatively and/or additionally, the first user input may comprise sliding a specific (e.g., defined) number of touch objects horizontally, vertically and/or diagonally on the touchscreen.

Accordingly, the action may (e.g., then) be performed (e.g., by the server and/or the client device). The action may comprise a delete action (e.g., corresponding to the first message), an archive action (e.g., corresponding to the first message), a move action (e.g., corresponding to the first message), a mark for later action (e.g., corresponding to the first message), a mark importance action (e.g., corresponding to the first message), a label action (e.g., corresponding to the first message), a reply action (e.g., corresponding to the first message), a forward action (e.g., corresponding to the first message) and/or one or more different actions. In some examples, the action may be performed (e.g., by the server and/or the client device) on the first message. In some examples, the second graphical object may be retrieved (e.g., by the server and/or the client device) from the messaging interface data structure responsive to performing the action. In some examples, responsive to performing the action, the second graphical object may be presented.

In some examples, the action may comprise displaying a list of actions (e.g., via a screen) comprising the delete action, the archive action, the move action, the mark for later action, the mark importance action, the label action, the reply action, the forward action and/or one or more different actions. In some examples, a selection of a second action (e.g., selected by the user) from the list of actions may be received (e.g., by the server and/or the client device). The selection may be received by using a conversational interface (e.g., a voice recognition and natural language interface), a touchscreen, a switch (e.g., an interface comprising one or more buttons) and/or a different type of interface. For example, the second action may be selected by pressing one or more touch objects on the touchscreen. Alternatively and/or additionally, the second action may be selected by pressing one or more buttons and/or switches. Alternatively and/or additionally, the second action may be selected by sliding one or more touch objects on the touchscreen.

In an example, the user may press a button (e.g., corresponding to the second action) with a touch object to select the second action. Accordingly, the second action may be performed (e.g., by the server and/or the client device) on the first message. In some examples, responsive to performing the second action, the second graphical object may be presented. In some examples, the second graphical object may be retrieved (e.g., by the server and/or the client device) from the messaging interface data structure responsive to performing the second action.

For example, the user may slide a touch object horizontally (e.g., vertically and/or diagonally) on the touchscreen. The list of actions may (e.g., then) be displayed. The user may select the delete action (e.g., from the list of actions) by pressing a button (e.g., comprising an icon representing the delete action) corresponding to the delete action. The delete action may (e.g., then) be performed (e.g., by the server and/or the client device) on the first message (e.g., the first message may be removed from the messaging account and/or one or more storage structures). The second graphical object may (e.g., then) be presented.

In some examples, responsive to receiving a second user input, the second graphical object may be presented. In some examples, the second graphical object may be retrieved (e.g., by the server and/or the client device) from the messaging interface data structure responsive to receiving the second user input. In some examples, the second graphical object may be displayed on the screen. At least a portion of the third graphical object may be displayed adjacent to (e.g., below, next to, etc.) the second graphical object on the screen (e.g., such that the third graphical object is partially visible). The second user input may be received by using a conversational interface (e.g., a voice recognition and natural language interface), a touchscreen, a switch (e.g., an interface comprising one or more buttons) and/or a different type of interface. In some examples, the second user input may comprise pressing one or more touch objects on the touch screen. Alternatively and/or additionally, the second user input may comprise pressing one or more buttons and/or switches. Alternatively and/or additionally, the second user input may comprise sliding one or more touch objects on the touchscreen.

For example, the second user input may comprise sliding one or more touch objects vertically (e.g., scrolling) on the touchscreen. In an example, the second user input may comprise sliding one touch object vertically on the touchscreen. Alternatively and/or additionally, the second user input may comprise (e.g., concurrently, sequentially, etc.) sliding two touch objects vertically on the touchscreen. Alternatively and/or additionally, the second user input may comprise (e.g., concurrently, sequentially, etc.) sliding three touch objects vertically on the touchscreen. Alternatively and/or additionally, the second user input may comprise (e.g., concurrently, sequentially, etc.) sliding a specific (e.g., defined) number of touch objects vertically on the touchscreen. Accordingly, the plurality of graphical objects may move (e.g., scroll) vertically from the first graphical object to the second graphical object. In some examples, the plurality of graphical objects may move (e.g., scroll) vertically continuously from the first graphical object to the second graphical object. Alternatively and/or additionally, the plurality of graphical objects may move (e.g., scroll) vertically based upon (e.g., controlled by) the second user input. For example, movement of the plurality of graphical objects may be controlled by movement of the one or more touch objects on the touch screen. A speed of the movement of the plurality of graphical objects may be based upon a speed of the movement of the one or more touch objects on the touch screen. A position of the plurality of graphical objects (e.g., the first graphical object and/or the second graphical object) may be based upon a position of the one or more touch objects on the touch screen.

Alternatively and/or additionally, the second user input may comprise sliding one or more touch objects horizontally (e.g., scrolling) on the touchscreen. In an example, the second user input may comprise sliding one touch object horizontally on the touchscreen. Alternatively and/or additionally, the second user input may comprise (e.g., concurrently, sequentially, etc.) sliding two touch objects horizontally on the touchscreen. Alternatively and/or additionally, the second user input may comprise (e.g., concurrently, sequentially, etc.) sliding three touch objects horizontally on the touchscreen. Alternatively and/or additionally, the second user input may comprise (e.g., concurrently, sequentially, etc.) sliding any number of touch objects horizontally on the touchscreen. Accordingly, the plurality of graphical objects may move (e.g., scroll) horizontally from the first graphical object to the second graphical object. In some examples, the plurality of graphical objects may move (e.g., scroll) horizontally continuously from the first graphical object to the second graphical object. Alternatively and/or additionally, the plurality of graphical objects may move (e.g., scroll) horizontally based upon (e.g., controlled by) the second user input. For example, movement of the plurality of graphical objects may be controlled by movement of the one or more touch objects on the touch screen. A speed of the movement of the plurality of graphical objects may be based upon a speed of the movement of the one or more touch objects on the touch screen. A position of the plurality of graphical objects (e.g., the first graphical object and/or the second graphical object) may be based upon a position of the one or more touch objects on the touch screen. Alternatively and/or additionally, the second user input may comprise sliding one or more touch objects diagonally (e.g., at an angle between a horizontal axis and a vertical axis) (e.g., scrolling) on the touchscreen.

In some examples, a messaging conversation may comprise a second plurality of messages. In some examples, the second plurality of messages may comprise the second message and a fourth message. In some examples, a fourth graphical object may be generated (e.g., by the server and/or the client device) based upon the fourth message. In some examples, the fourth graphical object may be stored (e.g., by the server and/or the client device) in the messaging interface data structure. In some examples, the fourth graphical object may be retrieved (e.g., by the server and/or the client device) from the messaging interface data structure. Responsive to receiving one or more second user inputs corresponding to the second graphical object, a third action associated with a first user input of the one or more second user inputs may be performed and/or the fourth graphical object may be presented (e.g., via a screen). In some examples, the fourth graphical object may be retrieved from the messaging interface data structure responsive to receiving the one or more second user inputs. The first user input (e.g., of the one or more second user inputs) may be received by using a conversational interface (e.g., a voice recognition and natural language interface), a touchscreen, a switch (e.g., an interface comprising one or more buttons) and/or a different type of interface. In some examples, the first user input (e.g., of the one or more second user inputs) may comprise pressing one or more touch objects on the touch screen. Alternatively and/or additionally, the first user input (e.g., of the one or more second user inputs) may comprise pressing one or more buttons and/or switches. Alternatively and/or additionally, the first user input (e.g., of the one or more second user inputs) may comprise sliding one or more touch objects on the touchscreen.

For example, the first user input (e.g., of the one or more second user inputs) may comprise sliding one or more touch objects horizontally and/or vertically on the touchscreen. Accordingly, the third action may (e.g., then) be performed (e.g., by the server and/or the client device). The third action may comprise a delete action, an archive action, a move action, a mark for later action, a mark importance action, a label action, a reply action, a forward action and/or one or more different actions. In some examples, responsive to performing the third action, the fourth graphical object may be presented. In some examples, the fourth graphical object may be retrieved (e.g., by the server and/or the client device) from the messaging interface data structure responsive to performing the third action.

In some examples, the third action may comprise displaying a second list of actions (e.g., via a screen) comprising the delete action, the archive action, the move action, the mark for later action, the mark importance action, the label action, the reply action, the forward action and/or one or more different actions. In some examples, a second selection of a fourth action (e.g., selected by the user) from the second list of actions may be received (e.g., by the server and/or the client device). The second selection may be received by using a conversational interface (e.g., a voice recognition and natural language interface), a touchscreen, a switch (e.g., an interface comprising one or more buttons) and/or a different type of interface. For example, the fourth action may be selected by pressing one or more touch objects on the touchscreen. Alternatively and/or additionally, the fourth action may be selected by pressing one or more buttons and/or switches. Alternatively and/or additionally, the fourth action may be selected by sliding one or more touch objects on the touchscreen. In some examples, responsive to performing the fourth action, the fourth graphical object may be presented. In some examples, the fourth graphical object may be retrieved (e.g., by the server and/or the client device) from the messaging interface data structure responsive to performing the fourth action.

In some examples, responsive to receiving a second user input of the one or more second user inputs, the fourth graphical object may be presented. In some examples, the fourth graphical object may be retrieved (e.g., by the server and/or the client device) from the messaging interface data structure responsive to receiving the second user input of the one or more second user inputs. The second user input (e.g., of the one or more second user inputs) may be received by using a conversational interface (e.g., a voice recognition and natural language interface), a touchscreen, a switch (e.g., an interface comprising one or more buttons) and/or a different type of interface. For example, the second user input (e.g., of the one or more second user inputs) may comprise sliding one or more touch objects vertically (e.g., scrolling) on the touchscreen. In an example, the second user input (e.g., of the one or more second user inputs) may comprise sliding a touch object vertically on the touchscreen. In some examples, the second user input (e.g., of the one or more second user inputs) may comprise pressing one or more touch objects on the touch screen. Alternatively and/or additionally, the second user input (e.g., of the one or more second user inputs) may comprise pressing one or more buttons and/or switches. The plurality of graphical objects may move (e.g., scroll) vertically from the first graphical object to the second graphical object.

Figure 5:
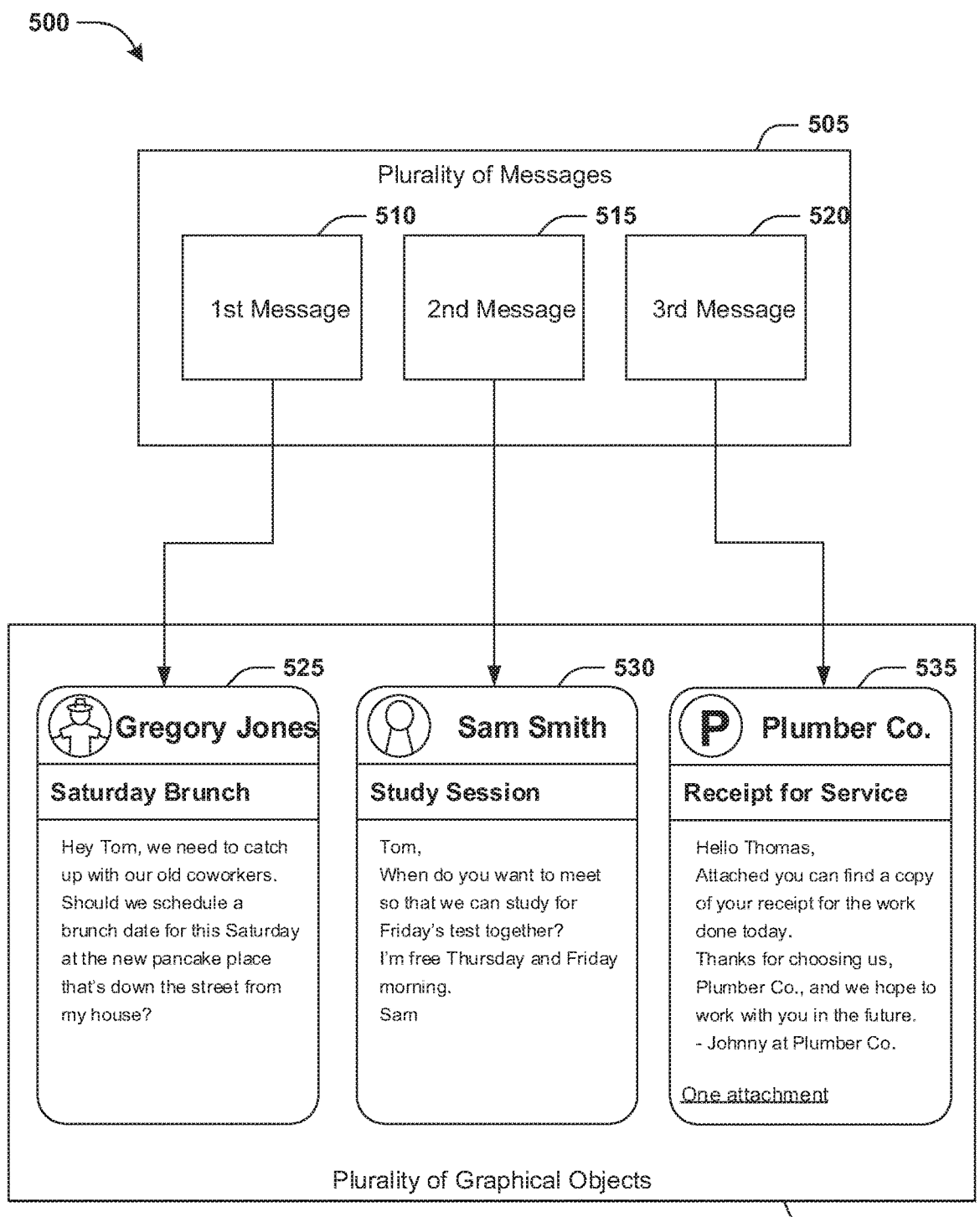
FIG. 5 is a component block diagram illustrating an example system for generating a plurality of graphical objects based upon a plurality of messages of a messaging account.

FIG. 5 illustrates a system 500 for generating a plurality of graphical objects 540 based upon a plurality of messages 505 of a messaging account. In some examples, a user, such as user Jill, (e.g., and/or a client device of the user) may access and/or interact with a service for sending and receiving messages. The messaging account of the user with the service may be accessed and/or interacted with via one or more interfaces on the client device, such as an email client, a browser, an app, or another interface on the client device. Accordingly, the plurality of messages 505, comprising a first message 510, a second message 515 and a third message 520, may be received (e.g., by a server and/or the client device) (e.g., via an email client, via a browser, via an app, via a social network, via an instant messaging service, etc.).

In some examples, the plurality of graphical objects 540 corresponding to the plurality of messages 505 may be generated (e.g., by the server and/or the client device) based upon (e.g., each of) the plurality of messages. Accordingly, a first graphical object 525 may be generated (e.g., by the server and/or the client device) based upon the first message 510. A second graphical object 530 may be generated (e.g., by the server and/or the client device) based upon the second message 515. A third graphical object 535 may be generated (e.g., by the server and/or the client device) based upon the third message 520. In some examples, the plurality of graphical objects 540 may (e.g., each) comprise a timestamp, a star icon, a sender name, a sender icon, one or more recipients, a subject, one or more attachments, content of (e.g., each of) the plurality of messages 505 and/or a (e.g., abstractive and/or extractive) summary of (e.g., each of) the plurality of messages 505.

Figure 6:
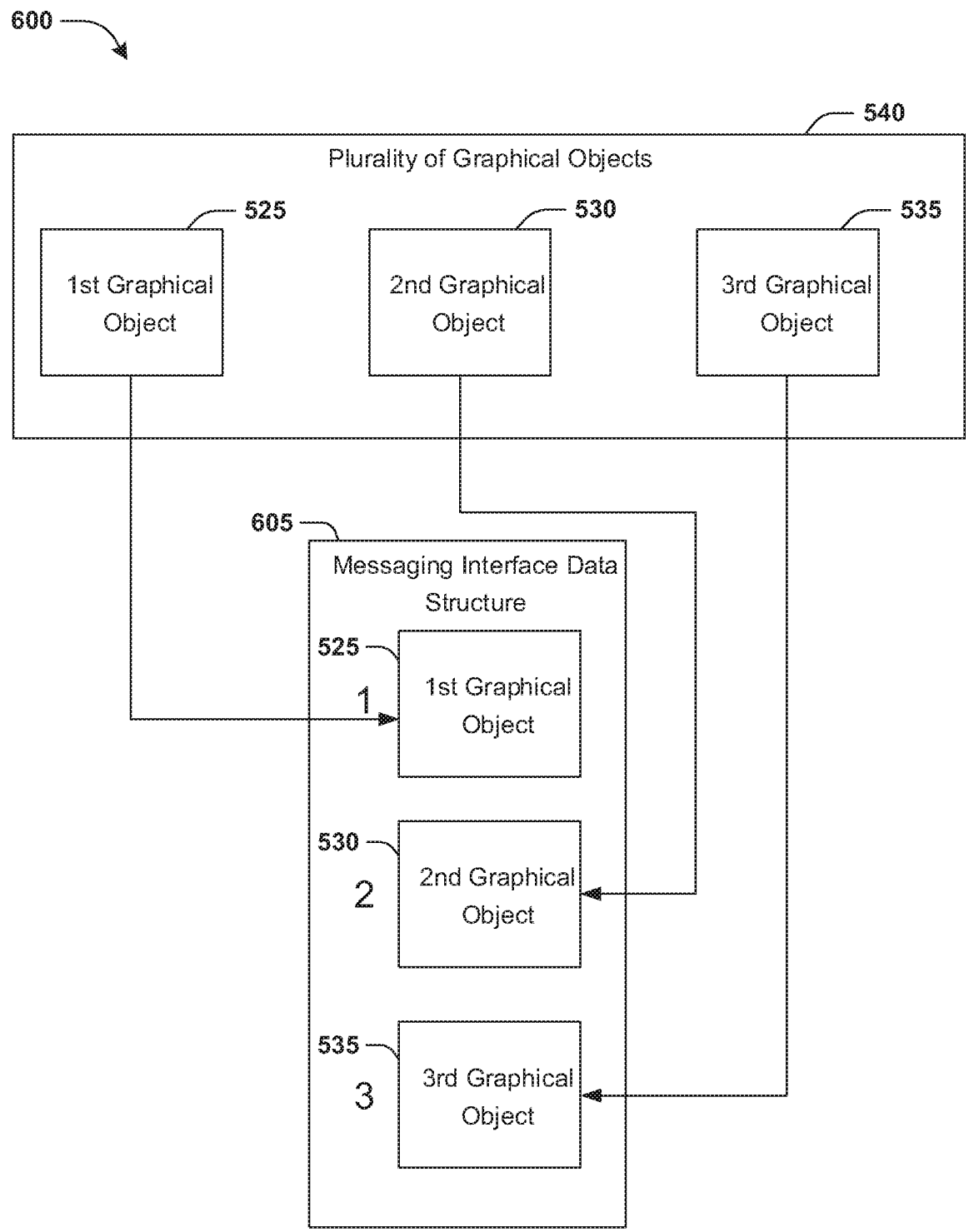
FIG. 6 is a component block diagram illustrating an example system for storing a plurality of graphical objects in a messaging interface data structure.

FIG. 6 illustrates a system 600 for storing the plurality of graphical objects 540 in a messaging interface data structure 605. In some examples, the plurality of graphical objects 540 (e.g., the first graphical object 525, the second graphical object 530 and the third graphical object 535) may be stored (e.g., and/or arranged) (e.g., by the server and/or the client device) in the messaging interface data structure 605 based upon an order (e.g., such that the plurality of graphical objects 540 may be presented according to the order).

For example, the order may be based upon a plurality of times corresponding to the plurality of messages. For example, the first message 510 may have a first timestamp corresponding to a first time. The second message 515 may have a second timestamp corresponding to a second time. The third message 520 may have a third timestamp corresponding to a third time. In an example, the third time may be after the second time and the second time may be after the first time. The first graphical object 525, the second graphical object 530 and the third graphical object 535 may be stored (e.g., and/or arranged) (e.g., by the server and/or the client device) in the messaging interface data structure 605 based upon the first time, the second time and the third time. The first graphical object 525, the second graphical object 530 and the third graphical object 535 may be stored (e.g., and/or arranged) (e.g., by the server and/or the client device) in the messaging interface data structure 605 such that the first graphical object 525 may be presented before the second graphical object 530 and the second graphical object 530 may be presented before the third graphical object 535. Alternatively and/or additionally, the first graphical object 525, the second graphical object 530 and the third graphical object 535 may be stored (e.g., and/or arranged) (e.g., by the server and/or the client device) in the messaging interface data structure 605 such that the first graphical object 525 may be presented after the second graphical object 530 and the second graphical object 530 may be presented after the third graphical object 535.

Alternatively and/or additionally, the order may be based upon a second plurality of times corresponding to a second plurality of messages within a messaging conversation. For example, the third time (e.g., corresponding to the third message 520) may be between the first time (e.g., corresponding to the first message 510) and the second time (e.g., corresponding to the second message 515) (e.g., the third time may be after the first time and before the second time). The first message 510 and the second message 515 may be comprised within the messaging conversation. The third message 520 may not be comprised within the messaging conversation. One or more graphical objects corresponding to messages within the messaging conversation (e.g., the first graphical object 525 and the second graphical object 530) and the third graphical object 535 may be stored (e.g., and/or arranged) (e.g., by the server and/or the client device) in the messaging interface data structure 605 such that the one or more graphical objects (e.g., the first graphical object 525 and the second graphical object 530) may be presented consecutively before the third graphical object 535.

Alternatively and/or additionally, the order may be based upon a plurality of importance rankings corresponding to the plurality of messages 505. The plurality of importance rankings may be determined (e.g., by the server and/or the client device) by analyzing a star icon, a sender, a sender icon, one or more recipients, a subject, one or more attachments and/or content of (e.g., each of) the plurality of messages 505. For example, the first message 510 may have a first importance ranking (e.g., determined by the server, the client device and/or the user). The second message 515 may have a second importance ranking (e.g., determined by the server, the client device and/or the user). The third message 520 may have a third importance ranking (e.g., determined by the server, the client device and/or the user). In an example, the first importance ranking may be higher than the second importance ranking and the second importance ranking may be higher than the third importance ranking. The first graphical object 525, the second graphical object 530 and the third graphical object 535 may be stored (e.g., and/or arranged) (e.g., by the server and/or the client device) in the messaging interface data structure 605 based upon the first importance ranking, the second importance ranking and the third importance ranking (e.g., rather than the first time, the second time and the third time). The first graphical object 525, the second graphical object 530 and the third graphical object 535 may be stored (e.g., and/or arranged) (e.g., by the server and/or the client device) in the messaging interface data structure such that the first graphical object may be presented before the second graphical object and the second graphical object may be presented before the third graphical object (e.g., in order of importance).

Alternatively and/or additionally, the second importance ranking may be equal to the third importance ranking and the first importance ranking may be higher than the second importance ranking and the third importance ranking. The first graphical object 525, the second graphical object 530 and the third graphical object 535 may be stored (e.g., and/or arranged) (e.g., by the server and/or the client device) in the messaging interface data structure 605 based upon the first importance ranking, the second importance ranking, the third importance ranking, the second time and the third time. The first graphical object 525, the second graphical object 530 and the third graphical object 535 may be stored (e.g., and/or arranged) (e.g., by the server and/or the client device) in the messaging interface data structure such that the first graphical object may be presented before the second graphical object (e.g., in order of importance) and the second graphical object may be presented before the third graphical object (e.g., based upon the second time and the third time).

Figure 7:
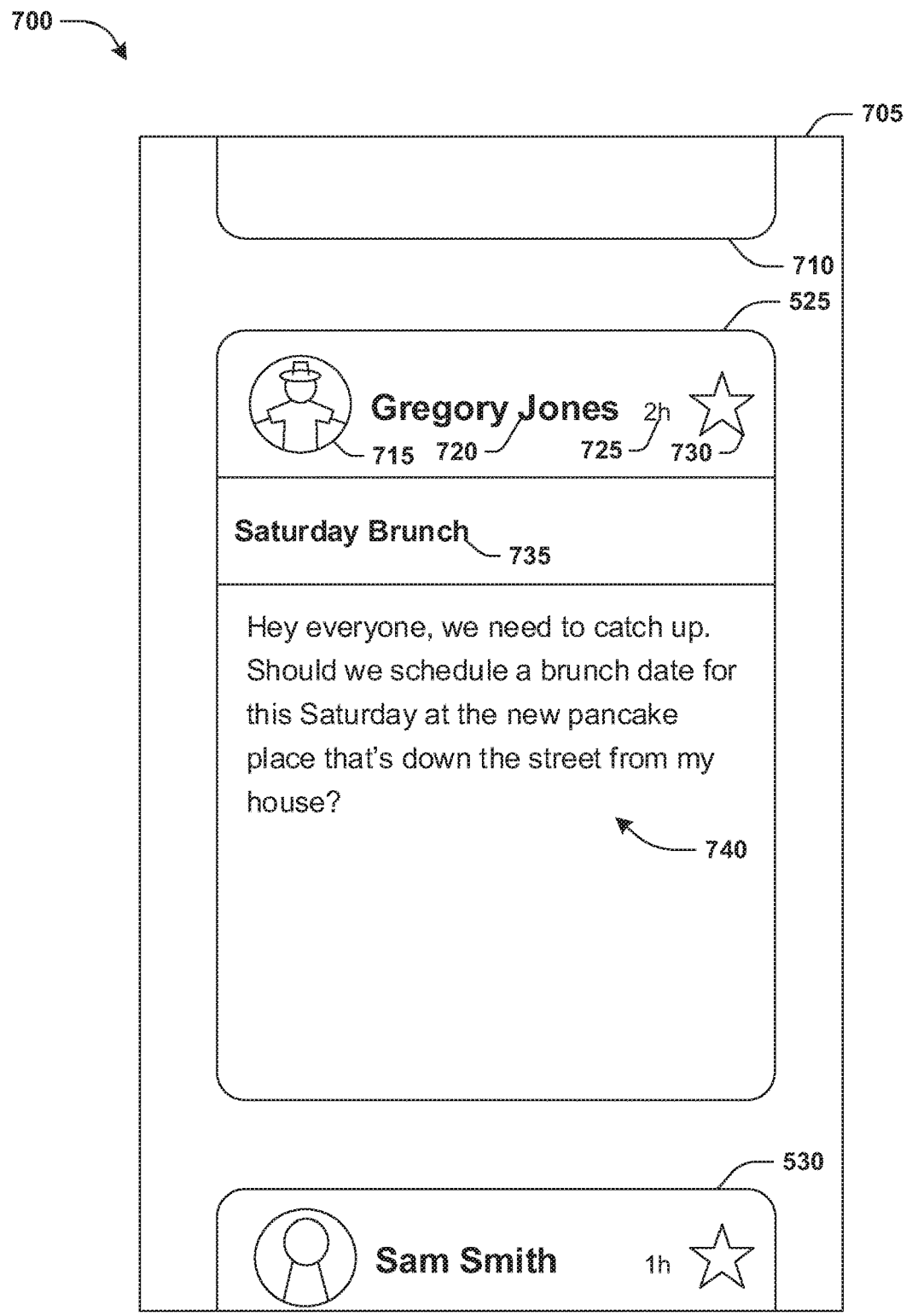
FIG. 7 is a component block diagram illustrating an example system for displaying a plurality of graphical objects via a screen.

FIG. 7 illustrates a system 700 for displaying (e.g., in a graphical user interface) the plurality of graphical objects 540 (e.g., generated by the server and/or the client device) via a screen 705. In some examples, the first graphical object 525 may be displayed on the screen 705. For example, the first graphical object 525 may be displayed in the middle of the screen 705. In some examples, a bottom portion of a graphical object 710 may be displayed above the first graphical object 525. The top portion of the second graphical object 530 may be displayed below the first graphical object 525. In some examples, the first graphical object 530 may comprise a timestamp 725, a star icon 730, a sender name 720, a sender icon 715, a subject 735 and/or content 740 of the first message 510.

In some examples, the sender icon 715 may be displayed on a top-left portion (e.g., corner) of the first graphical object 525. The sender icon 715 may comprise a visual representation of a sender of the first message 510 (e.g., Gregory Jones). In some examples, the sender name 720 may be displayed next to the sender icon 715. The sender name 720 may comprise a username and/or a user identification of the sender. In some examples, the timestamp 725 may be displayed next to the sender name 720. The timestamp 725 may indicate a time (e.g., and/or a date) that the first message 510 was sent. In some examples, the star icon 730 may be displayed next to the timestamp 725 (e.g., on a top-right portion of the first graphical object 525). The star icon 730 may indicate an importance of the first message 510. In some examples, the subject 735 may be displayed below the sender icon 715, the sender name 720, the timestamp 725 and/or the star icon 730. In some examples, the content 740 may be displayed underneath the subject 735. The content 740 may comprise a body of the first message 510.

Figure 8:
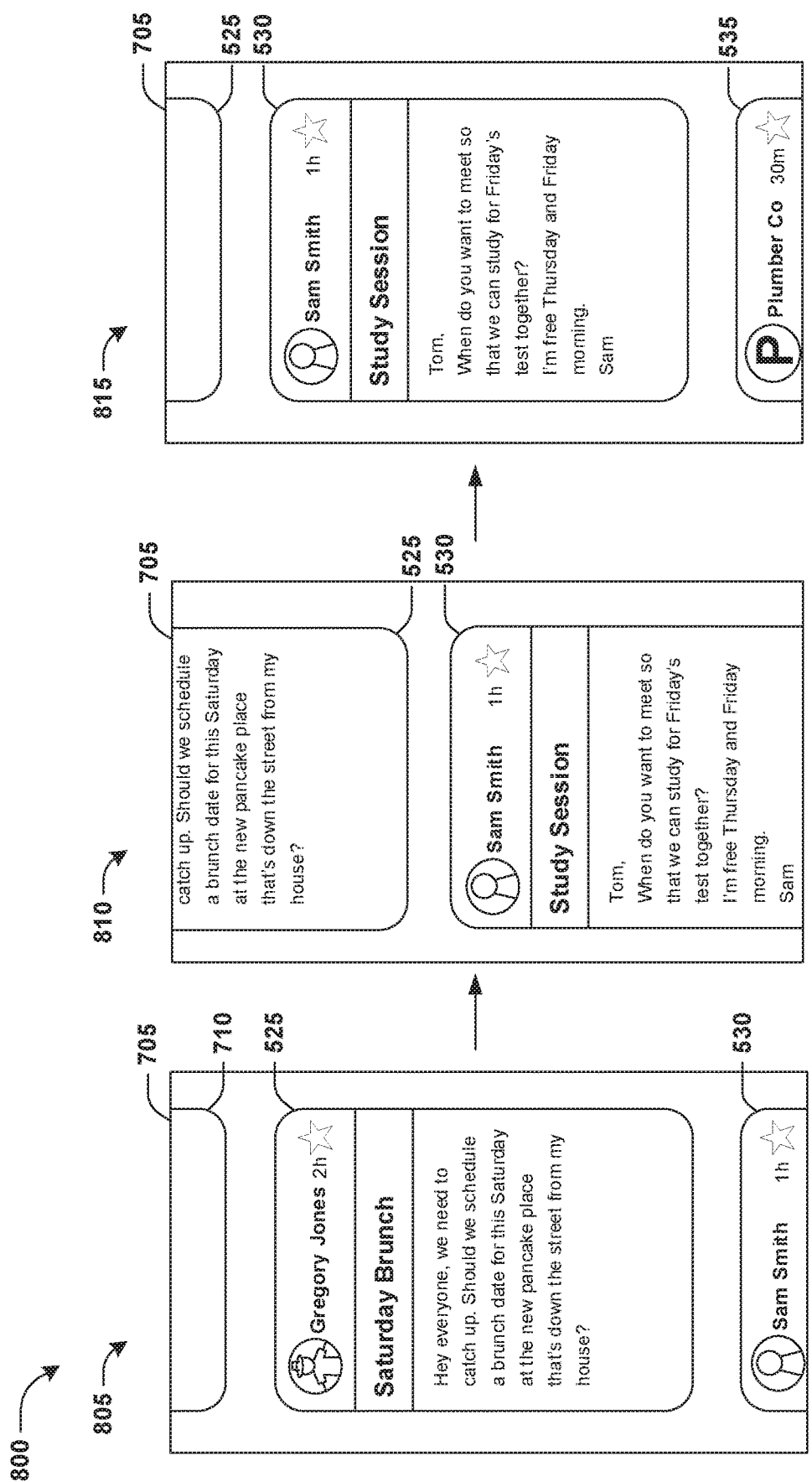
FIG. 8 is a component block diagram illustrating an example system for displaying a plurality of graphical objects via a screen.

FIG. 8 illustrates a system 800 for displaying (e.g., in a graphical user interface) the plurality of graphical objects 540 (e.g., generated by the server and/or the client device) via the screen 705. In some examples, the first graphical object 525 may be displayed on the screen 705 at a first instance 805. For example, at the first instance 805, the first graphical object 525 may be displayed in the middle of the screen 705. In some examples, at the first instance 805, a bottom portion of the graphical object 710 may be displayed above the first graphical object 525. At the first instance 805, the top portion of the second graphical object 530 may be displayed below the first graphical object 525.

In some examples, responsive to receiving one or more user inputs corresponding to the first graphical object 525, an action associated with a first user input of the one or more user inputs may be performed and/or the second graphical object 530 may be presented (e.g., via the screen 705). In some examples, the second graphical object 530 may be retrieved (e.g., by the server and/or the client device) from the messaging interface data structure 605. Responsive to receiving a second user input, the second graphical object 530 may be presented. The second graphical object 530 may be retrieved (e.g., by the server and/or the client device) from the messaging interface data structure 605 responsive to receiving the second user input. The second user input may be received by using a conversational interface (e.g., a voice recognition and natural language interface), a touchscreen, a switch (e.g., an interface comprising one or more buttons) and/or a different type of interface. For example, the second user input may comprise sliding one or more touch objects vertically (e.g., scrolling) on the screen 705. In an example, the second user input may comprise sliding a touch object vertically on the touchscreen. Accordingly, the plurality of graphical objects 540 may move (e.g., scroll) vertically from the first graphical object 525 to the second graphical object 530 (e.g., the screen 705 may change from displaying the first graphical object 525 to displaying the second graphical object 530).

In a second instance 810, the screen 705 may display the plurality of graphical objects 540 moving (e.g., scrolling) from the first graphical object 525 to the second graphical object 530. The second instance 810 may be after receipt of the second user input (e.g., after the first instance 805) and before completion of the plurality of graphical objects 540 moving (e.g., scrolling) vertically from the first graphical object 525 to the second graphical object 530 (e.g., before a third instance 815). In some examples, at the second instance 810, a portion of the first graphical object 525 may be displayed above a portion of the second graphical object 530.

In some examples, at the third instance 815 (e.g., after completion of the plurality of plurality of graphical objects 540 moving vertically from the first graphical object 525 to the second graphical object 530), the second graphical object 530 may be displayed in the middle of the screen 705. In some examples, at the third instance 815, a bottom portion of the first graphical object 525 may be displayed above the second graphical object 530. At the third instance 815, a top portion of the third graphical object 535 may be displayed below the second graphical object 530.

Figure 9:
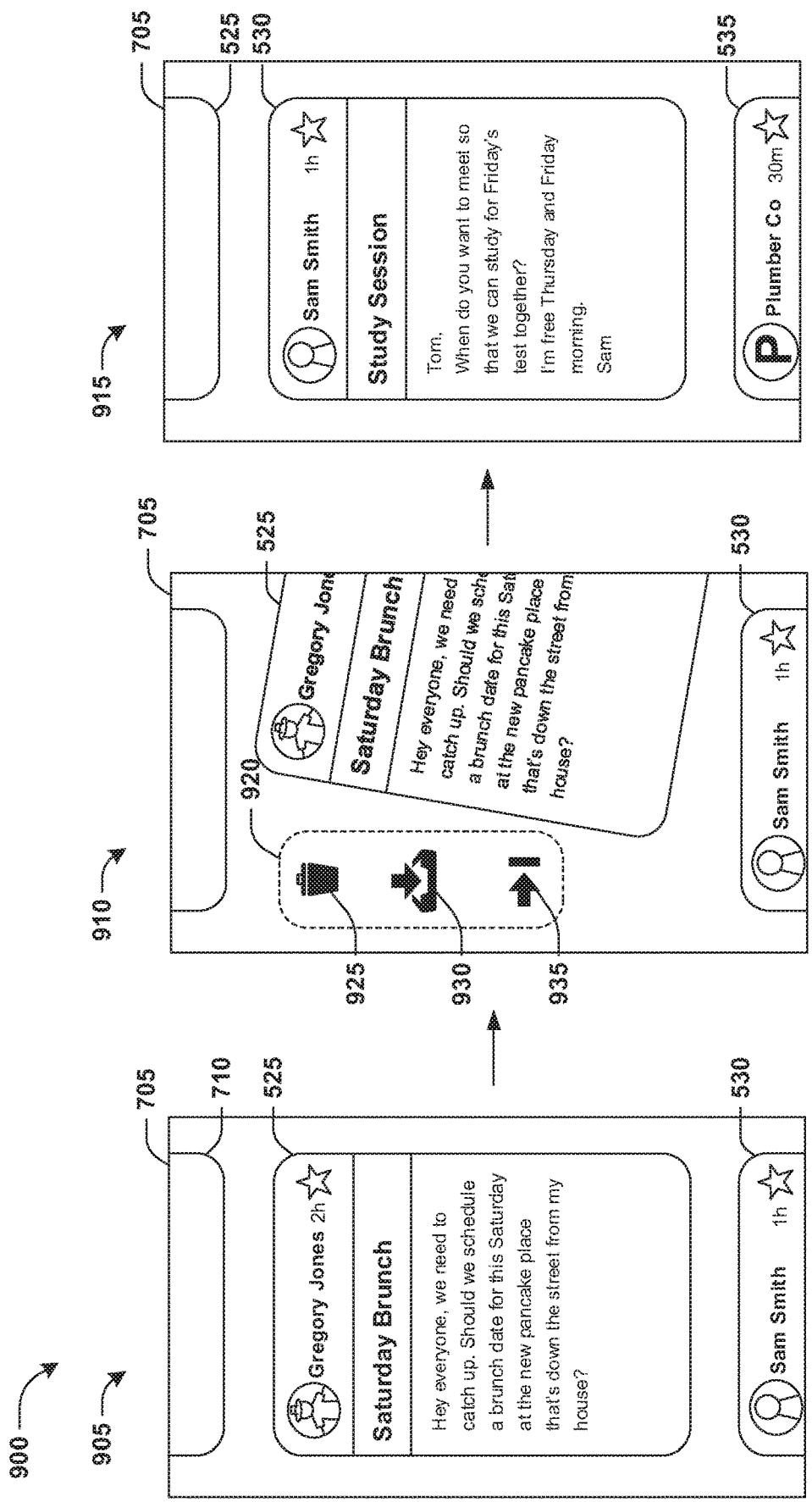
FIG. 9 is a component block diagram illustrating an example system for displaying a plurality of graphical objects via a screen.

FIG. 9 illustrates a system 900 for displaying (e.g., in a graphical user interface) the plurality of graphical objects 540 (e.g., generated by the server and/or the client device) via the screen 705. In some examples, the first graphical object 525 may be displayed on the screen 705 at a fourth instance 905. For example, at the fourth instance 905, the first graphical object 525 may be displayed in the middle of the screen 705. In some examples, at the fourth instance 905, a bottom portion of the graphical object 710 may be displayed above the first graphical object 525. At the fourth instance 905, the top portion of the second graphical object 530 may be displayed below the first graphical object 525.

In some examples, responsive to receiving one or more user inputs corresponding to the first graphical object 525, an action associated with a first user input of the one or more user inputs may be performed. In some examples, the first user input may be received by using a conversational interface (e.g., a voice recognition and natural language interface), a touchscreen, a switch (e.g., an interface comprising one or more buttons) and/or a different type of interface. For example, the first user input may comprise sliding one or more touch objects horizontally (e.g., or diagonally) (e.g., swiping) on the screen 705. In an example, the first user input may comprise sliding a touch object horizontally (e.g., or diagonally) on the screen 705. Accordingly, the action may be performed (e.g., by the server and/or the client device). The action may comprise a delete action, an archive action, a move action, a mark for later action, a mark importance action, a label action, a reply action, a forward action and/or one or more different actions. In some examples, responsive to performing the action (e.g., on the first message 510), the second graphical object 530 may be presented at a sixth instance 915. In some examples, the second graphical object 530 may be retrieved (e.g., by the server and/or the client device) from the messaging interface data structure 605 responsive to the performing the action (e.g., on the first message 510). In some examples, at the sixth instance 915, a bottom portion of the first graphical object 525 may be displayed above the second graphical object 530. At the sixth instance 915, a top portion of the third graphical object 535 may be displayed below the second graphical object 530.

In some examples, at a fifth instance 910, the action may be performed by displaying a list of actions 920 (e.g., via the screen 705) comprising a delete action 925, an archive action 930 and/or a move action 935 (e.g., and/or one or more different actions). In some examples, the action may comprise moving (e.g., tilting, rotating, moving diagonally, moving horizontally, etc.) the first graphical object 525 at the fifth instance 910.

In some examples, a selection of a second action (e.g., selected by the user) from the list of actions 920 may be received (e.g., by the server and/or the client device). The selection may be received by using a conversational interface (e.g., a voice recognition and natural language interface), a touchscreen, a switch (e.g., an interface comprising one or more buttons) and/or a different type of interface. For example, the second action may be selected by pressing one or more touch objects onto the screen 705. In an example, the user may press a button (e.g., corresponding to the second action) with a touch object to select the second action (e.g., the delete action 925, the archive action 930 and/or the move action 935) (e.g., from the list of actions 920. Accordingly, the second action (e.g., the delete action 925, the archive action 930 and/or the move action 935) may be performed (e.g., by the server and/or the client device) on the first message 510. In some examples, responsive to performing the second action (e.g., on the first message 510), the second graphical object 530 may be presented at the sixth instance 915. In some examples, the second graphical object 530 may be retrieved (e.g., by the server and/or the client device) from the messaging interface data structure 605 responsive to performing the second action (e.g., on the first message 510).

Figure 10:
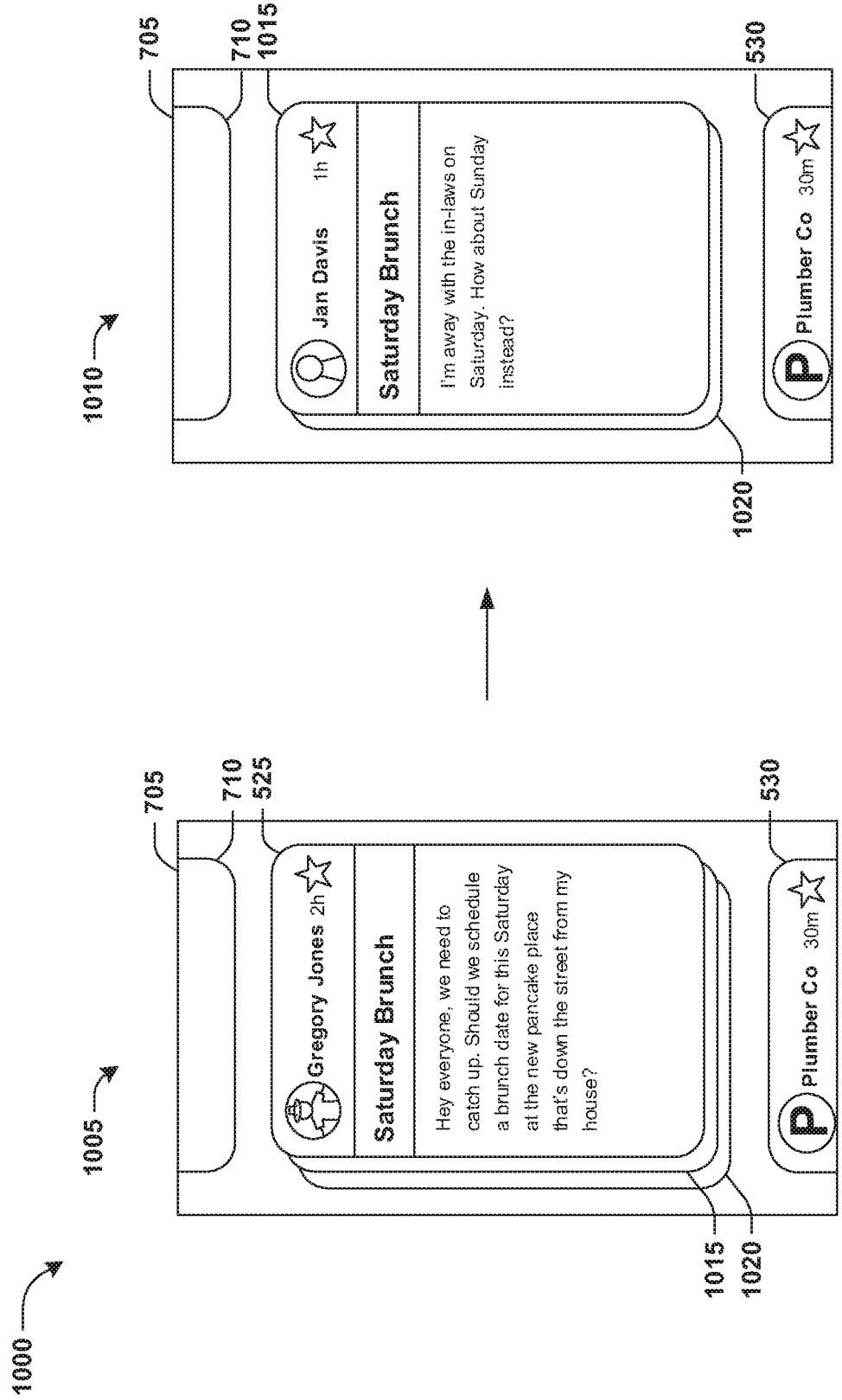
FIG. 10 is a component block diagram illustrating an example system for displaying a second plurality of graphical objects via a screen.

FIG. 10 illustrates a system 1000 for displaying (e.g., in a graphical user interface) a second plurality of graphical objects (e.g., generated by the server and/or the client device) via the screen 705. In some examples, the second plurality of graphical objects may correspond to a second plurality of messages comprised within a messaging conversation. The second plurality of messages may comprise the first message 510 (e.g., corresponding to the first graphical object 525), a fourth message corresponding to a fourth graphical object 1015 and a fifth message corresponding to a fifth graphical object 1020. Accordingly, the second plurality of graphical objects may comprise the first graphical object 525, the fourth graphical object 1015 and the fifth graphical object 1020.

In some examples, the first graphical object 525 may be displayed on the screen 705 at a seventh instance 1005. For example, at the seventh instance 1005, the first graphical object 525 may be displayed in the middle of the screen 705. In some examples, at the seventh instance 1005, a bottom portion of the graphical object 710 may be displayed above the first graphical object 525. At the seventh instance 1005, the top portion of the second graphical object 530 may be displayed below the first graphical object 525.

At the seventh instance 1005, the second plurality of graphical objects may be displayed as a stack of graphical objects. For example, at the seventh instance 1005, a side portion of the fourth graphical object 1015 may be displayed on the side of the first graphical object 525 and a bottom portion of the fourth graphical object 1015 may be displayed (e.g., directly) below the first graphical object 525. In some examples, at the seventh instance 1005, a side portion of the fifth graphical object 1020 may be displayed on the side of the side portion of the fourth graphical object 1015 and a bottom portion of the fifth graphical object 1020 may be displayed (e.g., directly) below the bottom portion of the fourth graphical object 1015.

In some examples, responsive to receiving one or more second user inputs corresponding to the first graphical object 525, a third action associated with a first user input of the one or more second user inputs may be performed and/or the fourth graphical object 1015 may be presented (e.g., rather than the second graphical object 530, responsive to a determination that the fourth graphical object 1015 corresponds to a same conversation as the first graphical object 525 while the second graphical object 530 does not) (e.g., via the screen 705). In some examples, the fourth graphical object 1015 may be retrieved from the messaging interface data structure 605 responsive to receiving the one or more second user inputs. The third action may comprise a delete action, an archive action, a move action, a mark for later action, a mark importance action, a label action, a reply action, a forward action and/or one or more different actions. In some examples, responsive to performing the third action (e.g., on the first message 510), the fourth graphical object 1015 may be presented at an eighth instance 1010 (e.g., rather than the second graphical object 530, responsive to a determination that the fourth graphical object 1015 corresponds to a same conversation as the first graphical object 525 while the second graphical object 530 does not). In some examples, the fourth graphical object 1015 may be retrieved (e.g., by the server and/or the client device) from the messaging interface data structure 605 responsive to performing the third action (e.g., on the first message 510).

In some examples, the third action may comprise displaying a second list of actions (e.g., via a screen) comprising the delete action, the archive action, the move action, the mark for later action, the mark importance action, the label action, the reply action, the forward action and/or one or more different actions. In some examples, a second selection of a fourth action (e.g., selected by the user) from the second list of actions may be received (e.g., by the server and/or the client device). The second selection may be received by using a conversational interface (e.g., a voice recognition and natural language interface), a touchscreen, a switch (e.g., an interface comprising one or more buttons) and/or a different type of interface. For example, the fourth action may be selected by pressing one or more touch objects onto the touchscreen. In some examples, responsive to performing the fourth action (e.g., on the first message 510), the fourth graphical object 1015 may be presented at the eighth instance 1010 (e.g., rather than the second graphical object 530, responsive to a determination that the fourth graphical object 1015 corresponds to a same conversation as the first graphical object 525 while the second graphical object 530 does not). In some examples, the fourth graphical object 1015 may be retrieved (e.g., by the server and/or the client device) from the messaging interface data structure responsive to performing the fourth action (e.g., on the first message 510).

In some examples, responsive to receiving a second user input of the one or more second user inputs, the fourth graphical object 1015 may be presented at the eighth instance 1010 (e.g., rather than the second graphical object 530, responsive to a determination that the fourth graphical object 1015 corresponds to a same conversation as the first graphical object 525 while the second graphical object 530 does not). In some examples, the fourth graphical object 1015 may be retrieved (e.g., by the server and/or the client device) from the messaging interface data structure 605 responsive to receiving the second user input of the one or more second user inputs. The second user input (e.g., of the one or more second user inputs) may be received by using a conversational interface (e.g., a voice recognition and natural language interface), a touchscreen, a switch (e.g., an interface comprising one or more buttons) and/or a different type of interface. For example, the second user input (e.g., of the one or more second user inputs) may comprise sliding one or more touch objects vertically (e.g., scrolling) on the screen 705. In an example, the second user input may comprise sliding a touch object vertically on the touchscreen. Accordingly, the screen 705 may change from (e.g., completely) displaying the first graphical object 525 to (e.g., completely) displaying the fourth graphical object 1015.

Figure 11:
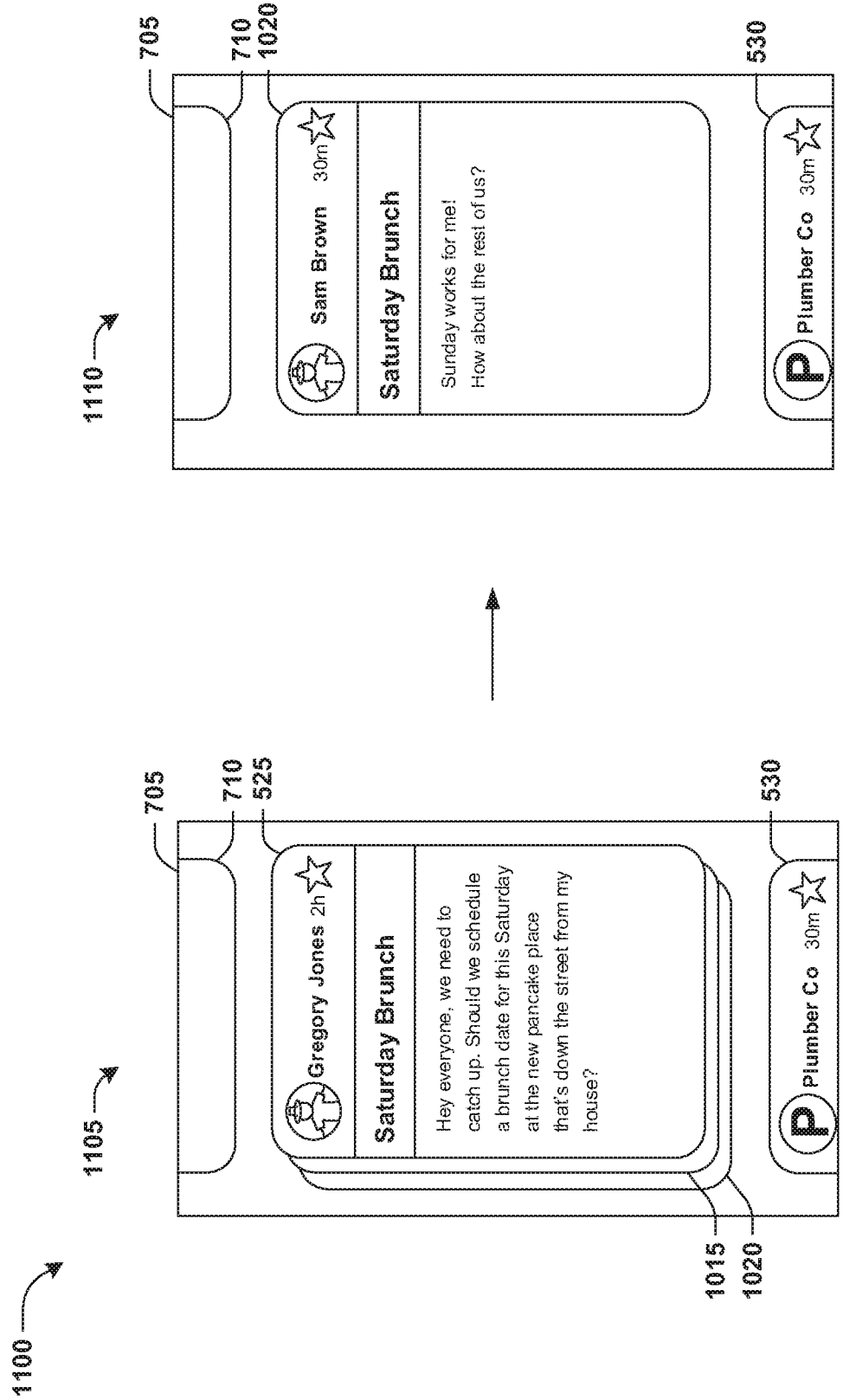
FIG. 11 is a component block diagram illustrating an example system for displaying a second plurality of graphical objects via a screen.

FIG. 11 illustrates a system 1100 for displaying (e.g., in a graphical user interface) the second plurality of graphical objects 540 (e.g., generated by the server and/or the client device) via the screen 705. In some examples, the first graphical object 525 may be displayed on the screen 705 at a ninth instance 1105. For example, at the ninth instance 1105, the first graphical object 525 may be displayed in the middle of the screen 705. In some examples, at the ninth instance 1105, a bottom portion of the graphical object 710 may be displayed above the first graphical object 525. At the ninth instance 1105, the top portion of the second graphical object 530 may be displayed below the first graphical object 525.

At the ninth instance 1105, the second plurality of graphical objects 540 may be displayed as a stack of graphical objects. For example, at the ninth instance 1105, a side portion of the fourth graphical object 1015 may be displayed on the side of the first graphical object 525 and a bottom portion of the fourth graphical object 1015 may be displayed (e.g., directly) below the first graphical object 525. In some examples, at the ninth instance 1105, a side portion of the fifth graphical object 1020 may be displayed on the side of the side portion of the fourth graphical object 1015 and a bottom portion of the fifth graphical object 1020 may be displayed (e.g., directly) below the bottom portion of the fourth graphical object 1015.

In some examples, responsive to receiving one or more user inputs corresponding to the fourth graphical object 1015 and/or the fifth graphical object 1020, the fourth graphical object 1015 and/or the fifth graphical object 1020 may be presented (e.g., via the screen 705) at a tenth instance 1110. In some examples, the fourth graphical object 1015 and/or the fifth graphical object 1020 may be retrieved from the messaging interface data structure 605 responsive to receiving the one or more user inputs corresponding to the fourth graphical object 1015 and/or the fifth graphical object 1020. For example, a third selection of the fifth graphical object 1020 may be received (e.g., by the server and/or the client device). The third selection may be received by using a conversational interface (e.g., a voice recognition and natural language interface), a touchscreen, a switch (e.g., an interface comprising one or more buttons) and/or a different type of interface. For example, the fifth graphical object 1020 may be selected by pressing one or more touch objects onto the touchscreen (e.g., pressing a button and/or an area representing the fifth graphical object 1020). Accordingly, the screen 705 may change from displaying the first graphical object 525 to displaying the fifth graphical object 1020 at the tenth instance 1110.

It may be appreciated that the disclosed subject matter may assist a user (e.g., and/or a device associated with the user) in viewing (e.g., and/or reading), determining a significance of and/or acting upon (e.g., one or more of) a plurality of messages via a plurality of graphical objects corresponding to the plurality of messages.

Implementation of at least some of the disclosed subject matter may lead to benefits including, but not limited to, a reduction in screen space and/or an improved usability of a display (e.g., of a client device) (e.g., as a result of presenting the plurality of messages via the plurality of graphical objects, as a result of performing one or more actions corresponding to one or more user inputs responsive to receiving the one or more user inputs, as a result of presenting one or more graphical objects of the plurality of graphical objects responsive to receiving the one or more user inputs, etc.). Alternatively and/or additionally, implementation of at least some of the disclosed subject matter may lead to benefits including a reduction in power consumption (e.g., as a result of the user spending less time viewing, determining the significance of and/or acting upon the plurality of messages, as a result of more efficiently viewing, determining the significance of and/or acting upon the plurality of messages, as a result of presenting the plurality of messages via the plurality of graphical objects, as a result of performing one or more actions corresponding to one or more user inputs responsive to receiving the one or more user inputs, as a result of presenting one or more graphical objects of the plurality of graphical objects responsive to receiving the one or more user inputs, as a result of a reduction of transmission and/or reception of data, as a result of navigating through the plurality of graphical objects while acting upon one or more messages of the plurality of messages without a need to navigate from or to the list of the plurality of messages, etc.). Alternatively and/or additionally, implementation of at least some of the disclosed subject matter may lead to benefits including a reduction in bandwidth (e.g., as a result of performing one or more actions and/or presenting one or more graphical objects without a need to present a list of the plurality of messages). Alternatively and/or additionally, implementation of at least some of the disclosed subject matter may lead to benefits including an increase in speed and usability of the client device (e.g., as a result of a faster transmission speed of the plurality of messages without the list of the plurality of messages as compared to a transmission of the plurality of messages with the list of the plurality of messages, as a result of fewer operations performed by a computer without generating the list of the plurality of messages as compared to operations performed by the computer with generating the list of the plurality of messages, etc.).

Further, implementation of at least some of the disclosed subject matter may lead to benefits for the user including, but not limited to, a reduction in time consumption for the user as a result of viewing (e.g., and/or reading), determining the significance of and/or acting upon (e.g., each of) the plurality of messages via the plurality of graphical objects and/or without a need to navigate from or to the list of the plurality of messages. Further, implementation of at least some of the disclosed subject matter may lead to a reduction in mental energy and/or attention loads for the user by providing the user a more convenient method for viewing (e.g., and/or reading), determining the significance of and/or acting upon (e.g., each of) the plurality of messages by navigating through the plurality of graphical objects while acting upon one or more messages of the plurality of messages without a need to navigate from or to the list of the plurality of messages.

In some examples, at least some of the disclosed subject matter may be implemented on a client device, and in some examples, at least some of the disclosed subject matter may be implemented on a server (e.g., hosting a service accessible via a network, such as the Internet).

Figure 12:
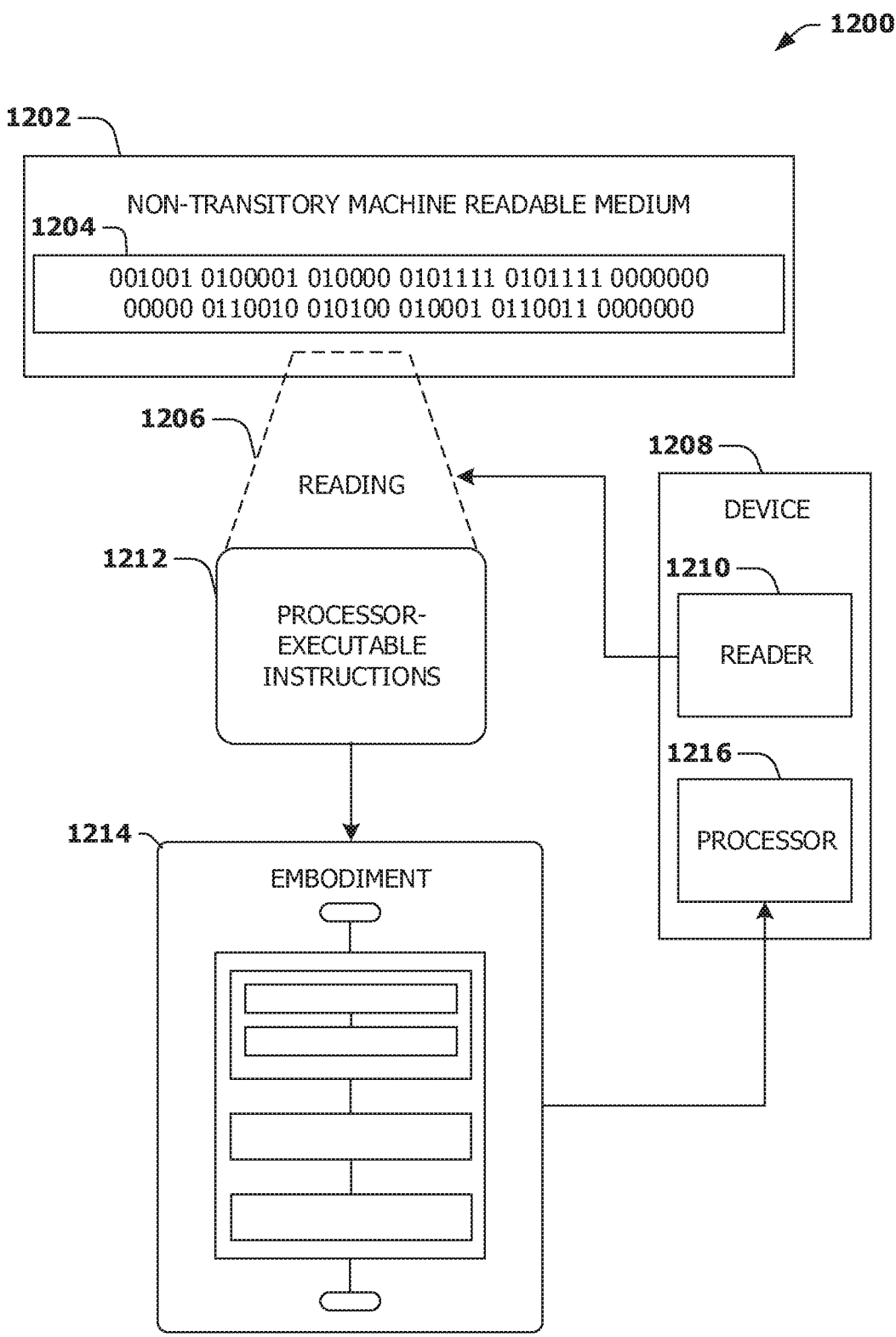
FIG. 12 is an illustration of a scenario featuring an example non-transitory machine readable medium in accordance with one or more of the provisions set forth herein.

FIG. 12 is an illustration of a scenario 1200 involving an example non-transitory machine readable medium 1202. The non-transitory machine readable medium 1202 may comprise processor-executable instructions 1212 that when executed by a processor 1216 cause performance (e.g., by the processor 1216) of at least some of the provisions herein (e.g., embodiment 1214). The non-transitory machine readable medium 1202 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 1202 stores computer-readable data 1204 that, when subjected to reading 1206 by a reader 1210 of a device 1208 (e.g., a read head of a hard disk drive, or a read operation invoked on a solid-state storage device), express the processor-executable instructions 1212. In some embodiments, the processor-executable instructions 1212, when executed, cause performance of operations, such as at least some of the example method 400 of FIGS. 4A-4B, for example. In some embodiments, the processor-executable instructions 1212 are configured to cause implementation of a system, such as at least some of the example system 500 of FIG. 5, the example system 600 of FIG. 6, the example system 700 of FIG. 7, the example system 800 of FIG. 8, the example system 900 of FIG. 9, the example system 1000 of FIG. 10 and/or the example system 1100 of FIG. 11, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for graphically presenting messages of a messaging account, comprising:

receiving a plurality of messages, associated with the messaging account, comprising a first message and a second message;

generating a first graphical object based upon the first message, wherein the generating the first graphical object comprises at least one of generating a first abstractive summary of the first message by applying natural language processing to the first message or generating a first extractive summary of the first message by extracting one or more extracts from the first message;

generating a second graphical object based upon the second message, wherein the generating the second graphical object comprises at least one of generating a second abstractive summary of the second message by applying natural language processing to the second message or generating a second extractive summary of the second message by extracting one or more extracts from the second message;

storing the first graphical object, comprising at least one of the first abstractive summary of the first message or the first extractive summary of the first message, in a messaging interface data structure;

storing the second graphical object, comprising at least one of the second abstractive summary of the second message or the second extractive summary of the second message, in the messaging interface data structure;

retrieving the first graphical object generated based upon the first message from the messaging interface data structure;

retrieving the second graphical object generated based upon the second message from the messaging interface data structure;

responsive to receiving a request to access the messaging account, displaying via a screen, at a first time, the first graphical object comprising at least one of the first abstractive summary of the first message or the first extractive summary of the first message, wherein, at the first time, at least part of the first graphical object generated based upon the first message is displayed at a first location of the screen;

responsive to receiving one or more user inputs corresponding to the first graphical object generated based upon the first message:

displaying via the screen, at a second time after the first time, a list of actions based upon a swipe user input of the one or more user inputs, wherein the list of actions comprises a first indication of a first action and a second indication of a second action, wherein selection of the first indication is configured to cause performance of the first action on the first message and selection of the second indication is configured to cause performance of the second action on the first message, wherein, at the second time, at least part of the list of actions is displayed at the first location of the screen at which the at least part of the first graphical object generated based upon the first message was displayed at the first time; and responsive to receiving a selection of the first indication of the first action in the list of actions:

performing the first action on the first message; and displaying via the screen, at a third time after the second time, the second graphical object comprising at least one of the second abstractive summary of the second message or the second extractive summary of the second message, the list of actions displayed via the screen concurrently with (i) at least part of the first graphical object generated based upon the first message and (ii) at least part of the second graphical object generated based upon the second message, the list of actions comprising indications of at least two of:

a delete action;
an archive action;
a move action;
a mark for later action;
a mark importance action;
a label action;
a reply action; or
a forward action.

2. The method of claim 1, the first graphical object and the second graphical object stored in the messaging interface data structure based upon an order.

3. The method of claim 2, the order determined based upon at least one of:

a plurality of times corresponding to the plurality of messages;
a second plurality of times corresponding to a second plurality of messages within a messaging conversation; or
a plurality of importance rankings corresponding to the plurality of messages.

4. The method of claim 1, wherein the generating the first graphical object comprises generating the first extractive summary of the first message by extracting one or more extracts from the first message,
wherein the first graphical object comprises the first extractive summary of the first message, wherein the generating the second graphical object comprises generating the second extractive summary of the second message by extracting one or more extracts from the second message,
wherein the second graphical object comprises the second extractive summary of the second message.

5. The method of claim 1, the first graphical object comprising at least one of:

a timestamp;
a star icon;
a sender of the first message;
a sender icon;
one or more recipients of the first message;
a subject of the first message; or
one or more attachments.

6. The method of claim 1, comprising:

responsive to receiving a second user input of the one or more user inputs, scrolling from the first graphical object to the second graphical object to present the second graphical object.

7. The method of claim 1, the first action comprising at least one of:

the delete action performed on the first message;
the archive action performed on the first message;
the move action performed on the first message;
the mark for later action performed on the first message;
the mark importance action performed on the first message;
the label action performed on the first message;
the reply action performed on the first message; or
the forward action performed on the first message.

8. The method of claim 1, the list of actions comprising indications of at least three actions that can be performed on the first message.

9. The method of claim 8, comprising:

receiving a selection of the second indication of the second action from the list of actions;
performing the second action on the first message; and
responsive to the performing the second action, presenting the second graphical object.

10. The method of claim 1, comprising:

responsive to receiving the request to access the messaging account, displaying a first portion of the second graphical object adjacent to the first graphical object,
the presenting the second graphical object comprising displaying a second portion of the second graphical object.

11. The method of claim 1, the presenting the first graphical object comprising:

displaying a first portion of the first graphical object; and
responsive to receiving a user input, displaying a second portion of the first graphical object.

12. The method of claim 1, at least one of the one or more user inputs received using at least one of:

a conversational interface;
a touchscreen; or
a switch.

13. The method of claim 1, the second message comprised within a messaging conversation comprising a second plurality of messages; and
the second plurality of messages comprising a third message.

14. The method of claim 13, comprising:

generating a third graphical object based upon the third message;

storing the third graphical object in the messaging interface data structure;
retrieving the second graphical object from the messaging interface data structure;
retrieving the third graphical object from the messaging interface data structure;
presenting the second graphical object; and
responsive to receiving one or more second user inputs corresponding to the second graphical object, at least one of:
performing a third action associated with a first user input of the one or more second user inputs; or
presenting the third graphical object.

15. The method of claim 14, comprising:
responsive to the performing the second action, presenting the third graphical object.

16. A computing device comprising:
a processor; and
memory comprising processor-executable instructions that when executed by the processor cause performance of operations, the operations comprising:
receiving a plurality of messages, associated with a messaging account, comprising a first message and a second message;
generating a first graphical object based upon the first message;
generating a second graphical object based upon the second message;
storing the first graphical object generated based upon the first message and the second graphical object generated based upon the second message in a messaging interface data structure;
retrieving the first graphical object generated based upon the first message from the messaging interface data structure;
retrieving the second graphical object generated based upon the second message from the messaging interface data structure;
responsive to receiving a request to access the messaging account, displaying via a screen, at a first time, the first graphical object generated based upon the first message, wherein, at the first time, at least part of the first graphical object generated based upon the first message is displayed at a first location of the screen;
responsive to receiving one or more user inputs corresponding to the first graphical object generated based upon the first message:
displaying via the screen, at a second time after the first time, a list of actions based upon a swipe user input of the one or more user inputs, wherein the list of actions comprises a first indication of a first action and a second indication of a second action, wherein selection of the first indication is configured to cause performance of the first action on the first message and selection of the second indication is configured to cause performance of the second action on the first message,
wherein, at the second time, at least part of the list of actions is displayed at the first location of the screen at which the at least part of the first graphical object generated based upon the first message was displayed at the first time; and
responsive to receiving a selection of the first indication of the first action in the list of actions:
performing the first action on the first message; and
displaying via the screen, at a third time after the second time, the second graphical object generated based upon the second message,
the list of actions displayed via the screen concurrently with (i) at least part of the first graphical object generated based upon the first message and (ii) at least part of the second graphical object generated based upon the second message, the list of actions comprising indications of at least two of:
a delete action;
an archive action;
a move action;
a mark for later action;
a mark importance action;
a label action;
a reply action; or
a forward action.

17. The computing device of claim 16, wherein the first graphical object is not displayed via the screen at the third time.

18. The computing device of claim 16, wherein at least part of the second graphical object is displayed at the first location of the screen at the third time.

19. A non-transitory machine readable medium having stored thereon processor-executable instructions that when executed cause performance of operations, the operations comprising:
receiving a plurality of messages, associated with a messaging account, comprising a first message and a second message;
generating a first graphical object based upon the first message, wherein the generating the first graphical object comprises generating a first extractive summary of the first message by extracting one or more extracts from the first message;
generating a second graphical object based upon the second message, wherein the generating the second graphical object comprises generating a second extractive summary of the second message by extracting one or more extracts from the second message;
storing the first graphical object, comprising the first extractive summary of the first message, in a messaging interface data structure;
storing the second graphical object, comprising the second extractive summary of the second message, in the messaging interface data structure;
retrieving the first graphical object generated based upon the first message from the messaging interface data structure;
retrieving the second graphical object generated based upon the second message from the messaging interface data structure;
responsive to receiving a request to access the messaging account, presenting, via an interface, the first graphical object comprising the first extractive summary of the first message at a first time;
responsive to receiving a horizontal sliding input corresponding to the first graphical object generated based upon the first message:
presenting, via the interface, the second graphical object comprising the second extractive summary of the second message at a second time; and
displaying a list of actions concurrently with (i) at least part of the first graphical object generated based upon the first message and (ii) at least part of the second graphical object generated based upon the second message, the list of actions comprising indications of at least two of:
a delete action;
an archive action;
a move action;
a mark for later action;
a mark importance action;
a label action;
a reply action; or
a forward action.

20. The non-transitory machine readable medium of claim 19, the first graphical object comprising at least one of:
a timestamp;
a star icon;
a sender of the first message;
a sender icon;
one or more recipients of the first message;
a subject of the first message; or
one or more attachments.

* * * * *